US012140281B2

(12) United States Patent
Skeren et al.

(10) Patent No.: US 12,140,281 B2
(45) Date of Patent: Nov. 12, 2024

(54) MODULAR LUMINAIRES

(71) Applicant: IQS GROUP s.r.o., Husinec-Rez (CZ)

(72) Inventors: Marek Skeren, Nova Ves (CZ); Zbynek Ryzi, Littleton, MA (US); Tomas Tethal, Husinec-Rez (CZ); Roman Houha, Prague (CZ)

(73) Assignee: IQS GROUP s.r.o., Husinec-Rez (CZ)

( * ) Notice: Subject to any disclaimer, the term of this patent is extended or adjusted under 35 U.S.C. 154(b) by 0 days.

(21) Appl. No.: 18/044,414

(22) PCT Filed: Sep. 8, 2021

(86) PCT No.: PCT/EP2021/074708

§ 371 (c)(1),
(2) Date: Mar. 8, 2023

(87) PCT Pub. No.: WO2022/053513

PCT Pub. Date: Mar. 17, 2022

(65) Prior Publication Data

US 2023/0341098 A1 Oct. 26, 2023

(30) Foreign Application Priority Data

Sep. 8, 2020 (GB) ..................................... 2014100

(51) Int. Cl.
*F21S 2/00* (2016.01)
*F21K 9/235* (2016.01)
(Continued)

(52) U.S. Cl.
CPC .............. *F21S 2/005* (2013.01); *F21K 9/235* (2016.08); *F21K 9/238* (2016.08); *F21S 8/046* (2013.01);
(Continued)

(58) Field of Classification Search
CPC ........... F21S 2/005; F21S 8/046; F21K 9/238; F21K 9/235; F21V 17/104; F21V 17/164;
(Continued)

(56) References Cited

U.S. PATENT DOCUMENTS 7,234,837 B2 * 6/2007 Hanano .................. F21V 5/045
257/E33.071
2005/0286252 A1 * 12/2005 Hanano .................. G03B 21/20
257/E33.071
(Continued)

FOREIGN PATENT DOCUMENTS

KR 100 944 366 3/2010
WO WO 2013/142437 9/2013

OTHER PUBLICATIONS

International Searching Authority: International Search Report and Written Opinion, Intl. App. No. PCT/EP2021/074708 (Jan. 3, 2022).
(Continued)

*Primary Examiner* — Bao Q Truong
(74) *Attorney, Agent, or Firm* — Walters & Wasylyna LLC

(57) ABSTRACT

An arrangement (1) for forming into a luminaire, the arrangement (1) comprising: one or more optical cells (10) each including means for receiving, collecting and redistributing light from a respective one of one or more light sources (32), e.g. LEDs; and a configuring element (20) for accommodating the one or more optical cells (10) in a predefined relative configuration or pattern; wherein the configuring element (20) comprises a sheet or plate or film of material having one or more apertures (22) therein in the said predefined relative configuration or pattern, each aperture (22) being for receiving therein a respective one of the said cells (10).

21 Claims, 5 Drawing Sheets

(51) Int. Cl.

| | |
|---|---|
| ***F21K 9/238*** | (2016.01) |
| ***F21S 8/04*** | (2006.01) |
| ***F21V 17/10*** | (2006.01) |
| ***F21V 17/16*** | (2006.01) |
| ***F21V 23/00*** | (2015.01) |
| *F21Y 113/20* | (2016.01) |

(52) U.S. Cl.
CPC .......... *F21V 17/104* (2013.01); *F21V 17/164* (2013.01); *F21V 23/005* (2013.01); *F21Y 2113/20* (2016.08)

(58) Field of Classification Search
CPC .... F21V 23/005; F21V 19/0015; F21V 5/007; F21V 7/0083; F21V 13/12; F21Y 2113/20; F21Y 2105/18
See application file for complete search history.

(56) References Cited

U.S. PATENT DOCUMENTS

| | | | | |
|---|---|---|---|---|
| 2010/0195330 | A1* | 8/2010 | Schaefer ................. | F21V 13/04 362/296.01 |
| 2011/0103051 | A1 | 5/2011 | Wilcox et al. | |
| 2016/0215955 | A1 | 7/2016 | Donato et al. | |

OTHER PUBLICATIONS

Intellectual Property Office, Search Report, App. No. GB2014100.8 (Jan. 8, 2021).

* cited by examiner

MODULAR LUMINAIRES

PRIORITY

This application is the U.S. national phase entry of Intl. App. No. PCT/EP2021/074708 filed on Sep. 8, 2021, which claims priority from GB2014100.8 filed on Sep. 8, 2020. The entire contents of PCT/EP2021/074708 and GB2014100.8 are incorporated herein by reference.

TECHNICAL FIELD

This invention relates to modular luminaires, more particularly (though not exclusively) to luminaires comprising one or more light sources (especially, though not exclusively, LEDs) and which employ a modular system of construction comprising plural discrete optical cells which can be assembled into various arrangements for producing luminaires of various configurations and designs. In particular, as well as relating to such luminaires themselves, the invention also relates to arrangements or arrays of optical cells for assembly into luminaires, and to methods for the assembly of luminaires utilizing such arrangements or arrays.

BACKGROUND AND PRIOR ART

As used herein, the term "luminaire" refers to and means an apparatus or device for emitting light in a particular desired distribution or pattern, comprising at least one, especially a plurality of, light source(s), and various other structural and/or optical components which are designed to connect the light source(s) to a power supply, to position and protect the light source(s), and to distribute the light emitted by the light source(s) into the desired light output distribution or pattern. Such luminaires may be utilised for lighting applications in a wide range of indoor or outdoor scenarios and settings, including for example: industrial and commercial premises, offices and other workplaces, public buildings, private premises of various kinds, domestic settings, as well as others.

The past decade in the lighting industry can be characterized principally as a transition period from conventional incandescent and fluorescent lighting to LED (light emitting diode)-based lighting. Compared with conventional light bulbs and tubes, LEDs represent much more compact light sources, and they are also much more favourable in terms of energy consumption and environmental impact. However, such advantages also come with various disadvantages.

Looking at their advantages purely from an optical standpoint, small LED light sources give designers much greater flexibility in designing optics which can shape emitted light with much higher degrees of precision and complexity than is possible with conventional light sources. Being small, LED sources also enable the design of more compact luminaires, and they can be easily arranged to form various shapes and layouts which may in itself add aesthetic value to any given final design of luminaire. Due to their higher efficiency of converting electricity into light, compared with conventional light sources, LEDs also play an important role in energy-saving and ultimately less negative impact on the environment.

However, LEDs do have some disadvantages as well. Conversion of electrical energy into luminous energy happens over a very small area of an LED chip. Despite a high efficiency of conversion, there is still a significant portion of the overall converted energy which gets transferred as heat and which is concentrated into a very small area. The heat dissipation then becomes a key problem to solve, especially in the use of LEDs with high luminous flux. The small light-emitting area of an LED may also pose a problem for a user or viewer of a luminaire or other lighting apparatus containing it. If viewed directly, an LED looks like an extremely bright, possibly blindingly so, dot. Therefore it is often desirable to increase the area of a LED's light-emitting surface, which is typically done by an appropriate additional optical element (or optical system) or diffuser. Both of these disadvantages can sometimes be suppressed, for example by arranging lower brightness LEDs into larger arrays—since lower brightness LEDs do not require such intensive cooling and in practice they may not be as blinding for the viewer even without the use of special optics.

In fact, most known LED-based luminaires comprise an arrangement of a plurality of LEDs, typically integrated on a circuit board. Typically they are combined into an optical element with one or more uniform optical features (e.g. diffusers) or embedded individualized optical features (e.g. lenses, reflectors) which convert the LED light into a desired output light distribution pattern. The individualized optical features embedded in an optical element are usually represented by an arrangement or array of one or more lenses and/or reflectors, which may be embossed or molded into such an optical element. Such an arrangement of individualized optics is generally fixed and needs to be synchronized (i.e. matched) with the arrangement of LEDs on the circuit board. Patent documents US 2016/0215955 A1, U.S. Pat. No. 9,212,803 B2, US 2006/0291206 A1 and US 2009/0002985 A1 show some examples of such known arrangements. Examples of luminaires with arrangements of LEDs used in combination with non-individualized optics can be seen in patent documents US 2019/0368683 A1, U.S. Pat. No. 8,579,467 B1 and US 2009/0323334 A1, for example.

There are also known modular systems which can be used to create various luminaire arrangements from preconfigured cells containing an LED on a circuit board and attached optics, such as that described and illustrated in U.S. Pat. No. 8,845,129 B1. These cells can be arranged into linear or rectangular arrays, the optical cells being connected to each other through the electrical connectors on the LED circuit board, and then installed into a luminaire body. These optical cells represent individualized optics operating on a single LED which are not pre-arranged into a specific array. The final arrangement of the optical cells is achieved only at the point of assembly of the final luminaire to create a desired overall optical cell configuration therein.

Another example of a known modular system of components which can be used for illumination is disclosed in EP 3192334 A1, in which a circuit board is designed to accept electrical components including LEDs with further attached optical components. Plural LED sources of the same or different types can be combined with optics of the same or different types, while the circuit board holds them together in one specific arrangement.

Yet another known modular system of optics operating on an array of LEDs is shown in US 2010/0225639 A1. Here a rectangular louver mask array, which controls blocking of the light, is designed to accept optics carriers in each of the respective positions of the array cells, and various optical elements for processing light emitted by respective LEDs can be inserted into these carriers. The entire assembly is positioned over an array of the LEDs.

All the above different approaches to arranging specific kinds of optics over an array of LEDs play a role in how luminaires have developed in the lighting industry to what we see and are commercially available today. Pre-arranged fixed arrays of individual optics can be particularly useful in high volume production of luminaires, and modular systems with individualized optics give designers more freedom in designing various arrays suitable for various designs of luminaires.

However, known systems and techniques for providing pre-arranged arrays of individual optics for use with corresponding arrays of LEDs tend to be over-engineered and are still far from ideal, especially in terms of simplicity of construction, ease of use and versatility. Furthermore, the known systems and techniques have limitations in their ability to be applied to the production of luminaires across a wide range of sizes, shapes and designs, whilst still maintaining the versatility and advantages of a modular-type system.

It is thus a primary object of the present invention to address the shortcomings of the known art of luminaires and to provide a modular luminaire building or assembly system that is simple and cheap to manufacture, easy to use, and versatile in being able to be applied to the production of luminaires across a wide range of sizes, shapes and designs.

SUMMARY OF THE INVENTION

Accordingly, in a first aspect the present invention provides an arrangement for forming into a luminaire, the arrangement comprising:

one or more optical cells each including means for receiving, collecting and redistributing light from a respective one of one or more light sources; and a configuring element for accommodating the one or more optical cells in a predefined relative configuration or pattern;

wherein the configuring element comprises a sheet or plate or film of material having one or more apertures therein in the said predefined relative configuration or pattern, each aperture being configured for receiving therein a respective one of the said optical cells.

In an alternative first aspect the present invention provides an arrangement for forming into a luminaire, the arrangement comprising:

one or more optical cells each including means for receiving, collecting and redistributing light from a respective one of one or more light sources; and a configuring element accommodating the one or more optical cells in a predefined relative configuration or pattern;

wherein the configuring element comprises a sheet or plate or film of material having one or more apertures therein in the said predefined relative configuration or pattern, each aperture being configured for and having received therein a respective one of the said optical cells.

In some practical embodiment forms of the above-defined arrangement of the first aspect, it may be provided in a physical form in which the one or more light sources is/are present or has/have been mounted or positioned or otherwise included in or on or adjacent the respective optical cell(s) of the arrangement, and the cell(s) has/have been received in the respective aperture(s) of the configuring element. In this case, in a second aspect the present invention provides an arrangement for forming into a luminaire, the arrangement comprising:

one or more optical cells each having mounted or positioned therein or thereon or thereadjacent a respective one of one or more light sources, whereby the or each optical cell can receive, collect and redistribute light from a respective said light source; and a configuring element accommodating or carrying the one or more optical cells in a predefined relative configuration or pattern;

wherein the configuring element comprises a sheet or plate or film of material having one or more apertures therein in the said predefined relative configuration or pattern, each aperture having received therein a respective one of the said optical cells.

In some such practical embodiment forms of the above-defined arrangement of the second aspect, in addition to the above-defined one or more optical cells and the configuring element, the arrangement may further comprise at least one circuit board or wiring board, or a portion of a circuit board or wiring board, having the said one or more light sources mounted, or pre-mounted, thereon, especially in the said predefined relative configuration or pattern.

In a third aspect the present invention provides a luminaire comprising:

at least one arrangement according to the first aspect of the invention or any embodiment thereof;

a body or frame in which is contained the said arrangement; and one or more light sources, each said light source being mounted or positioned in or on or adjacent a respective optical cell received in a respective aperture of the said configuring element, whereby the or each optical cell can receive, collect and redistribute light from a respective said light source;

whereby the one or more light sources are contained in the luminaire in the said predefined relative configuration or pattern defined by the aperture(s) in the configuring element.

In some embodiments of the above-defined luminaire of the third aspect, the luminaire may further comprise at least one circuit board or wiring board on which is/are mounted, or has/have been pre-mounted, the said one or more light sources.

In some practical embodiment forms of the above-defined luminaire of the third aspect, it may be provided in a physical form in which the one or more light sources has/have not yet been included, mounted or positioned in or on or adjacent the respective optical cell(s) of the arrangement. In this case, in a fourth aspect the present invention further provides an assembly for forming into a luminaire, the assembly comprising:

at least one arrangement according to the first aspect of the invention or any embodiment thereof; and a body or frame in which is contained the said arrangement;

wherein each respective optical cell received in a respective aperture of the said configuring element is for receiving, collecting and redistributing light from a respective one of the said one or more light sources in the said predefined relative configuration or pattern defined by the aperture(s) in the configuring element.

In some other practical embodiment forms of the above-defined luminaire of the third aspect, it may—perhaps practically more usually or usefully—be provided in a physical form in which the one or more light sources (optionally mounted or pre-mounted on at least one circuit board or wiring board, or a portion of a circuit board or wiring board) has/have already been included, positioned or mounted in or on or adjacent the respective optical cell(s) of the arrangement, but the arrangement+light source(s) (optionally+circuit/wiring board or portion thereof) combination(s) (or pre-assembled arrangement+light source(s) (optionally+circuit/wiring board or portion thereof) combination(s) or unit(s)) has/have not yet been mounted or positioned in the body or frame of the luminaire. In this case, in an alternative fourth aspect the present invention further provides an assembly for forming into a luminaire, the assembly comprising:

at least one arrangement according to the first aspect of the invention or any embodiment thereof; and one or more light sources, each said light source being mounted or positioned in or on or adjacent a respective optical cell received in a respective aperture of the said configuring element, whereby the or each optical cell can receive, collect and redistribute light from a respective said light source;

optionally wherein the or each light source is mounted or pre-mounted on at least one circuit board or wiring board, or a portion of a circuit board or wiring board, and the said assembly further comprises said circuit board or wiring board, or portion of either thereof.

In some yet other practical embodiment forms of the above-defined luminaire of the third aspect, it may even be provided in a physical form in which the one or more light sources, especially the one or more light sources mounted or pre-mounted on at least one circuit board or wiring board or a portion of a circuit board or wiring board, has/have already been mounted or positioned in the body or frame of the luminaire, but the arrangement including the optical cell(s) has not yet been brought together with, or mounted or positioned on or over or adjacent, the respective light source(s). In this case in a further alternative fourth aspect the present invention further provides an assembly for forming into a luminaire, the assembly comprising:

a body or frame; and one or more light sources mounted or positioned in the body or frame, the or each said light source being mounted or pre-mounted on at least one circuit board or wiring board or a portion of a circuit board or wiring board, wherein the or each light source is arranged and/or positioned and/or configured for having mounted or positioned thereon or thereover or thereadjacent a respective optical cell of an arrangement according to the first aspect of the invention or any embodiment thereof, once the or the respective arrangement has been mounted or positioned in the body or frame.

In a fifth aspect the present invention provides a method of production of a luminaire, the method comprising:

(i) forming an arrangement according to the first aspect of the invention or any embodiment thereof by:

(i)(a) providing one or more optical cells each including means for receiving, collecting and redistributing light from a respective one of one or more light sources;

(i)(b) providing a configuring element for accommodating the one or more optical cells in a predefined relative configuration or pattern, wherein the configuring element comprises a sheet or plate or film of material having one or more apertures therein in the said predefined relative configuration or pattern, each aperture being configured for receiving therein a respective one of the said optical cells; and (i)(c) inserting each respective optical cell into a respective aperture in the configuring element so as to form the said arrangement;

(ii) mounting or positioning one or more light sources in or on or adjacent respective optical cell(s) received in respective aperture(s) of the said configuring element, whereby the resulting relative configuration or pattern of the said one or more light sources is substantially the same as or corresponds to the said predefined relative configuration or pattern of the apertures in the configuring element; and, either before or after this step (ii), (iii) mounting or positioning the arrangement in a body or frame of the luminaire.

In some embodiments of the above-defined method of the fifth aspect, the step (ii) of mounting or positioning the said one or more light sources in or on or adjacent respective optical cell(s) received in respective aperture(s) of the said configuring element may comprise mounting or positioning in or on or adjacent respective optical cell(s) of the arrangement at least one circuit board or wiring board, or a portion of a circuit board or wiring board, on which has/have already been pre-mounted the said one or more light sources in the said relative configuration or pattern which is substantially the same as or corresponds to the said predefined relative configuration or pattern of the apertures in the configuring element. Alternatively this particular step (ii) may be thought of or defined as comprising mounting or positioning respective optical cell(s) of the arrangement on or over or adjacent respective one(s) of the said one or more light sources, especially on or over or adjacent respective one(s) of the said one or more light sources which has/have already been pre-mounted on the said circuit board or wiring board or portion of a circuit board or wiring board.

However, in some practical embodiment forms of the above-defined method of the fifth aspect, it may be carried out only to the extent that the one or more light sources has/have not yet been included, mounted or positioned in or on or adjacent the respective cell(s) of the arrangement. In this case, in a sixth aspect the present invention further provides a method of production of an assembly for forming into a luminaire, the method comprising:

(i) forming an arrangement according to the first aspect of the invention or any embodiment thereof by:

(i)(a) providing one or more optical cells each including means for receiving, collecting and redistributing light from a respective one of one or more light sources;

(i)(b) providing a configuring element for accommodating the one or more optical cells in a predefined relative configuration or pattern, wherein the configuring element comprises a sheet or plate or film of material having one or more apertures therein in the said predefined relative configuration or pattern, each aperture being configured for receiving therein a respective one of the said optical cells; and (i)(c) inserting each respective optical cell into a respective aperture in the configuring element so as to form the said arrangement; and (ii) mounting or positioning the arrangement in a body or frame of the luminaire, to form the said assembly.

In some other practical embodiment forms of the above-defined method of the fifth aspect, it may—perhaps practically more usually or usefully—be carried out only to the extent that the one or more light sources (optionally mounted or pre-mounted on at least one circuit board or wiring board, or a portion of a circuit board or wiring board) has/have already been included, positioned or mounted in or on or adjacent the respective optical cell(s) of the arrangement, but the arrangement+light source(s) (optionally+circuit/wiring board or portion thereof) combination(s) (or pre-assembled arrangement+light source(s) (optionally+circuit/wiring board or portion thereof) combination(s) or unit(s)) has/have not yet been mounted or positioned in the body or frame of the luminaire. In this case, in an alternative sixth aspect the present invention further provides a method of production of an assembly for forming into a luminaire, the method comprising:

(i) forming an arrangement according to the first aspect of the invention or any embodiment thereof by:
 (i)(a) providing one or more optical cells each including means for receiving, collecting and redistributing light from a respective one of one or more light sources;
 (i)(b) providing a configuring element for accommodating the one or more optical cells in a predefined relative configuration or pattern, wherein the configuring element comprises a sheet or plate or film of material having one or more apertures therein in the said predefined relative configuration or pattern, each aperture being configured for receiving therein a respective one of the said optical cells; and
 (i)(c) inserting each respective optical cell into a respective aperture in the configuring element so as to form the said arrangement; and
(ii) mounting or positioning one or more light sources in or on or adjacent respective optical cell(s) received in respective aperture(s) of the said configuring element, whereby the resulting relative configuration or pattern of the said one or more light sources is substantially the same as or corresponds to the said predefined relative configuration or pattern of the apertures in the configuring element, to form the said assembly;

optionally wherein the or each light source is already mounted or has already been pre-mounted on at least one circuit board or wiring board, or a portion of a circuit board or wiring board, and the said assembly further comprises said circuit board or wiring board, or portion of either thereof.

In some yet other practical embodiment forms of the above-defined method of the fifth aspect, it may be carried out only to the extent that the one or more light sources, especially the one or more light sources mounted or pre-mounted on at least one circuit board or wiring board or a portion of a circuit board or wiring board, has/have already been mounted or positioned in the body or frame of the luminaire, but the arrangement including the optical cell(s) has not yet been brought together with, or mounted or positioned on or over or adjacent, the respective light source(s). In this case in a further alternative sixth aspect the present invention further provides a method of production of an assembly for forming into a luminaire, the method comprising:

(i) forming an arrangement according to the first aspect of the invention or any embodiment thereof by:
 (i)(a) providing one or more optical cells each including means for receiving, collecting and redistributing light from a respective one of one or more light sources;
 (i)(b) providing a configuring element for accommodating the one or more optical cells in a predefined relative configuration or pattern, wherein the configuring element comprises a sheet or plate or film of material having one or more apertures therein in the said predefined relative configuration or pattern, each aperture being configured for receiving therein a respective one of the said optical cells; and
 (i)(c) inserting each respective optical cell into a respective aperture in the configuring element so as to form the said arrangement;
(ii) providing a body or frame of the luminaire;
(iii) mounting or positioning in the body or frame one or more light sources, the or each said light source being mounted or pre-mounted on at least one circuit board or wiring board or a portion of a circuit board or wiring board,
 wherein the or each light source is arranged and/or positioned and/or configured for having mounted or positioned thereon or thereover or thereadjacent a respective optical cell of an arrangement according to the first aspect of the invention or any embodiment thereof, once the or the respective arrangement has been mounted or positioned in the body or frame.

In a yet further alternative sixth aspect the present invention further provides a method of production of an assembly for forming into a luminaire, the method comprising:

(i) forming an arrangement according to the first aspect of the invention or any embodiment thereof by:
 (i)(a) providing one or more optical cells each including means for receiving, collecting and redistributing light from a respective one of one or more light sources;
 (i)(b) providing a configuring element for accommodating the one or more optical cells in a predefined relative configuration or pattern, wherein the configuring element comprises a sheet or plate or film of material having one or more apertures therein in the said predefined relative configuration or pattern, each aperture being configured for receiving therein a respective one of the said optical cells; and
 (i)(c) inserting each respective optical cell into a respective aperture in the configuring element so as to form the said arrangement;
(ii) providing at least one circuit board or wiring board, or a portion of a circuit board or wiring board, having mounted or pre-mounted thereon one or more light sources, wherein the relative configuration or pattern of the said one or more light sources on the circuit board or wiring board, or portion of either thereof, is substantially the same as or corresponds to the said predefined relative configuration or pattern of the apertures in the configuring element; and
(iii) mounting the arrangement onto the said circuit board or wiring board, or portion of either thereof, whereby said mounting of the arrangement serves to simultaneously mount or position the one or more light sources in or on or adjacent respective optical cell(s) received in respective aperture(s) of the said configuring element, to form the said assembly.

In the immediately above-defined method of this alternative sixth aspect, if desired or appropriate, step (i)(c) may follow step (iii), so that the optical cell(s) is/are added/introduced into the assembly to complete the arrangement only once the configuring element has been mounted on the circuit board or wiring board, or portion of either thereof. In that case, therefore, in an even yet further alternative sixth aspect the present invention further provides a method of production of an assembly for forming into a luminaire, the method comprising:

(i) providing part of an arrangement according to the first aspect of the invention or any embodiment thereof by:
 (i)(a) providing one or more optical cells each including means for receiving, collecting and redistributing light from a respective one of one or more light sources; and
 (i)(b) providing a configuring element for accommodating the one or more optical cells in a predefined relative configuration or pattern, wherein the configuring element comprises a sheet or plate or film of material having one or more apertures therein in the said predefined relative configuration or pattern, each aperture being configured for receiving therein a respective one of the said optical cells;

(ii) providing at least one circuit board or wiring board, or a portion of a circuit board or wiring board, having mounted or pre-mounted thereon one or more light sources, wherein the relative configuration or pattern of the said one or more light sources on the circuit board or wiring board, or portion of either thereof, is substantially the same as or corresponds to the said predefined relative configuration or pattern of the apertures in the configuring element;

(iii) mounting the configuring element onto the said circuit board or wiring board, or portion of either thereof, whereby said mounting of the configuring element serves to simultaneously mount or position the one or more light sources in respective positions or locations, relative to the respective aperture(s) of the configuring element, in which the one or more light sources will, when the respective optical cell(s) has/have been added/introduced into the assembly by being inserted into the respective aperture(s) in the configuring element, be mounted or positioned in or on or adjacent the said respective optical cell(s) once received in the respective aperture(s) of the configuring element; and then, subsequent to this step (iii)

(i)(c) inserting each respective optical cell into a respective aperture in the configuring element already mounted on the circuit board or wiring board, or portion of either thereof, so as to complete the said arrangement and to form the said assembly.

In an even yet further aspect of the present invention there is provided a method of forming or production of an arrangement for forming into a luminaire, the method comprising:

(i)(a) providing one or more optical cells each including means for receiving, collecting and redistributing light from a respective one of one or more light sources;

(i)(b) providing a configuring element for accommodating the one or more optical cells in a predefined relative configuration or pattern, wherein the configuring element comprises a sheet or plate or film of material having one or more apertures therein in the said predefined relative configuration or pattern, each aperture being configured for receiving therein a respective one of the said optical cells; and (i)(c) inserting the or each respective optical cell into a or a respective aperture in the configuring element, so as to form the said arrangement;

In a seventh aspect the present invention provides a kit of parts for use in forming a luminaire, the kit comprising:

one or more, or any plurality of, optical cells each including means for receiving, collecting and redistributing light from a respective one of one or more light sources; and a configuring element for accommodating the one or more optical cells in a predefined relative configuration or pattern, wherein the configuring element comprises a sheet or plate or film of material having one or more apertures therein in the said predefined relative configuration or pattern, each aperture being configured for receiving therein a respective one of the said optical cells;

optionally together with a body or frame for containing the components of the luminaire, and/or optionally the said one or more, or the said plurality of, light sources for mounting or positioning in or on or adjacent a respective optical cell when received in a respective said aperture of the said configuring element, whereby the or each optical cell can receive, collect and redistribute light from a respective said light source.

As used herein, the term "light" is intended to be construed broadly as meaning any wavelength/frequency of electromagnetic radiation in the electromagnetic spectrum. However, in most practical embodiments of the invention, light in the visible region of the spectrum may be employed and may thus be provided by the various light sources. However, it may be possible, e.g. in certain more specialist embodiments, for one or more LEDs or other light sources to be employed which emit electromagnetic radiation in one or more non-visible, e.g. infra-red or ultraviolet, regions of the spectrum.

In many embodiments of the invention in its various aspects, the or each light source of the one or more light sources may each comprise one or more LEDs (light emitting diodes). However, it may still be within the scope of the invention, in other embodiments, for each light source of the one or more light sources to each comprise one or more other types of light-emitting device, for example one or more filament-based or halogen-based (or other gas-based) light bulbs or light-emitting devices.

In some such embodiments each one of the one or more light sources may comprise a single LED (or other light emitting device). In such embodiments, therefore, the or each optical cell may comprise, or may have mounted or positioned therein or thereon or thereadjacent, or may be for having mounted or positioned therein or thereon or thereadjacent, a single LED (or other light emitting device).

However, in other such embodiments each one of the one or more light sources may comprise a plurality of LEDs (or other light emitting devices), e.g. in the form of an array, cluster, series or group, especially one in which the LEDs (or other light emitting devices) are closely or tightly packed so as to be in close proximity to one another. In such other embodiments, therefore, each optical cell may comprise or may have mounted or positioned therein or thereon or thereadjacent, or may be for having mounted or positioned therein or thereon or thereadjacent, an array, cluster, series or group of a plurality of LEDs (or other light emitting devices). Within individual such arrays/clusters/series/groups of pluralities of LEDs (or other light emitting devices) the LEDs/devices may be arranged in any desired geometrical manner relative to each other, e.g. symmetrically, asymmetrically, regularly, irregularly, linearly (e.g. in one or more straight or curved lines) or even randomly. Furthermore, within each individual such array/cluster/series/group of a plurality of LEDs (or other light emitting devices) the LEDs/devices may be arranged or mounted substantially in a single plane, e.g. by virtue of being mounted on at least one substantially planar circuit board or wiring board, or substantially planar portion of a circuit board or wiring board.

In certain embodiments of the invention, one or more of the light source(s) may even comprise one or more multi-chip LEDs (such as a dual-chip LED, e.g. a dual colour LED, a quad RGBW chip LED, or even others).

Furthermore, in many embodiments of the invention in its broader aspects as variously defined above, the said one or more light sources in the said relative configuration or pattern which are used to form the luminaire may themselves be mounted or arranged, and especially may be provided ready for use and assembly by being pre-mounted or pre-arranged, on at least one circuit board or wiring board, or at least one portion of a circuit board or wiring board, in substantially a single common plane, especially for example by virtue of being mounted or pre-mounted on a single common planar circuit board or wiring board, or a single common planar portion of either thereof, or a plurality of individual circuit board or wiring board elements each lying in a common plane.

Alternatively, however, in certain other embodiments of the invention in its broader aspects as variously defined above, the said one or more light sources in the said relative configuration or pattern which are used to form the luminaire may themselves be mounted or arranged, and especially may be provided ready for use and assembly by being pre-mounted or pre-arranged, either:

(i) on a single common circuit board or wiring board, or a single common portion of either thereof, which is shaped or configured in a substantially non-planar, e.g. arcuate or otherwise curved in three dimensions, shape or configuration, or (ii) on a plurality of individual circuit board or wiring board elements which are collectively arranged or configured relative to each other so as to form a substantially non-planar, e.g. arcuate or otherwise curved in three dimensions, shaped or configured circuit board/wiring board arrangement.

In any given embodiment of a luminaire or an assembly within the scope of the invention, means may be provided, e.g. in the form of appropriate wiring and/or circuitry, for connecting each LED (or other light emitting device) to an appropriate electrical power source, which may for example be provided either as an external power source (e.g. the electrical mains, optionally via a transformer) or alternatively as an on-board battery or other power supply, e.g. contained within the overall luminaire body or frame.

In some practical embodiments of the invention, in particular in embodiments comprising a plurality of light sources, the various light sources may be arranged in the final luminaire—or in the arrangement or assembly ready for forming into the luminaire—in the said predefined relative configuration or pattern that corresponds to the predefined relative configuration or pattern of the apertures in the configuring element, which itself defines the relative configuration or pattern in which the respective optical cells are arranged once they have been received therein. Thus, when the various light sources, e.g. LEDs, are provided in the form of at least one circuit board or wiring board, or portion of a circuit board or wiring board, having the various LEDs already mounted thereon, the arrangement of the LEDs thereon may thus be the same as, or correspond to, or match, or be synchronized with, the predefined relative configuration or pattern of the apertures in the configuring element. In this manner, the at least one circuit board or wiring board, or portion of either thereof, with the pre-mounted LEDs thereon, can be simply brought together with the configuring element and optical cells received in the apertures therein, e.g. with the discrete optical cells being glued or otherwise attached (e.g. by clips or snap- or click-fit devices) to the at least one circuit- or wiring board (or portion of either thereof), and the arrangement components assembled together into the final luminaire, without further adjustment or reconfiguring of the LEDs' arrangement.

In many embodiments of the arrangement of the invention, and of luminaires and/or assemblies comprising same, in the or each optical cell, the means for receiving, collecting and redistributing light from a respective one of one or more light sources, or the optical cell itself, may comprise:

a structure having one or more structure elements or portions, the structure element(s) or portion(s) comprising:

an input for receiving and collecting light from at least one light source, and an output via which light is outputted from the optical cell, and the structure element(s) or portion(s) including one or more walls or surfaces configured for collecting light entering the structure via its input and conveying or directing or allowing or effecting passage of light, or otherwise redistributing light, a portion of the light, through the structure towards its output.

In any given embodiment, depending on the form, construction, composition and/or configuration of the structure element(s) or portion(s), each of the one or more walls or surfaces thereof, or at least a portion of any thereof, may perform or effect or act to produce any one or more of the said effects of conveying or directing or allowing or effecting passage of light, or otherwise redistributing light, or a portion of the light, through the structure either individually or collectively or in any combination of two or more thereof.

In some relatively basic embodiment forms, in the or each optical cell, the means for receiving, collecting and redistributing light from a respective one of one or more light sources, or the optical cell itself, may comprise:

a structure comprising at least one housing, body, casing or container, and including an input for receiving and collecting light from at least one light source, and an output via which light is outputted from the optical cell, and the at least one housing, body, casing or container including the said one or more walls or surfaces configured for collecting light entering the housing, body, casing or container via its input and conveying or directing or allowing or effecting passage of light, or otherwise redistributing light, or a portion of the light, through the housing, body, casing or container towards its output.

In some practical embodiments of such relatively basic forms of the or each optical cell, the structure may further comprise a cover component on or attached to the at least one housing, body, casing or container, for providing said output via which light is outputted from the optical cell.

However, in some relatively more advanced embodiment forms, in the or each optical cell, the means for receiving, collecting and redistributing light from a respective one of one or more light sources, or the optical cell itself, may comprise:

(i) a light collector element, and (ii) a cover element attached to the light collector element, optionally (or especially) together with (iii) a transmission element mounted between the light collector element and the cover element.

Thus, in such relatively more advanced embodiment forms, the or each optical cell may itself comprise the said:

(i) light collector element, and (ii) cover element attached to the light collector element, optionally (or especially) together with the said (iii) transmission element mounted between the light collector element and the cover element.

In some such embodiments of the above more advanced form, the or each optical cell may comprise:

(i) a light collector element, (ii) a cover element attached to the light collector element, and (iii) a transmission element mounted between the light collector element and the cover element;

wherein:

(iv) the light collector element comprises a body including:

an input for receiving and collecting light from at least one light source, an output for propagating collected light towards the transmission element, at least one wall defining one or more portions of the body between its input and output and configured for collecting light entering the body via its input and conveying or directing said light towards its output, and attachment means for mechanically attaching the body of the light collector element to the cover element and securing the transmission element between the light collector element and the cover element;

(v) the cover element comprises:

an input opening facing towards the transmission element and for receiving light transmitted by the transmission element, an output opening via which light is outputted from the optical cell, and at least one internal surface defining a cavity within the cover element between its input and output openings, the cavity's internal surface(s) being configured for allowing or effecting passage of light, or a portion of the light, through the cavity from the cover element's input opening towards its output opening; and (vi) the transmission element comprises:

one or more planar optical elements, wherein the or each optical element includes a first surface facing towards the output of the light collector element and a second surface facing towards the input opening of the cover element, and the or each optical element exhibits a predetermined optical activity or function in its transmission of light incident thereon which has exited the output of the light collector element and is transmitted by the transmission element towards the input opening of the cover element.

In some of the above embodiments of the invention in which the or each optical cell is of the above-defined more advanced form, the light collector element of the or each optical cell may comprise a body including:

an input for receiving and collecting light from at least one light source, an output for propagating collected light towards the transmission element, at least one wall defining one or more portions of the body between its input and output and configured for collecting light entering the body via its input and conveying or directing said light towards its output, and attachment means for mechanically attaching the body of the light collector element to the cover element and securing the transmission element between the light collector element and the cover element;

In a first species of some such embodiments, the light collector element of the or each optical cell may take the form of a hollow body, the body comprising:

an input opening for receiving and collecting light from at least one light source, an output opening for propagating collected light towards the transmission element, at least one internal wall defining a chamber within the light collector element between its input and output openings, the chamber wall(s) being configured for collecting light entering the chamber via the light collector element's input opening and conveying or directing or redirecting said light, or a portion of said light, towards its output opening, and attachment means for mechanically attaching the light collector element to the cover element and securing the transmission element between the light collector element and the cover element.

However in a second species of some such embodiments, the light collector element of the or each optical cell may take the form of a body, especially a substantially solid body, of light-permeable or light-transparent or light-transmissible material, the body comprising:

an input surface for receiving and collecting light from at least one light source, an output surface for propagating collected light towards the transmission element, at least one wall, especially at least one exterior wall, defining one or more portions of the body of the light collector element between its input and output surfaces, the at least one wall being configured for collecting light entering the body via the light collector element's input surface and redirecting and/or guiding said light, or a portion of said light, towards its output surface at least in part by means of TIR (total internal reflection) phenomena, and attachment means for mechanically attaching the light collector element to the cover element and securing the transmission element between the light collector element and the cover element.

Thus in various such more advanced embodiments of the invention in its various aspects, the light collector element of the or each optical cell, or of any one or more optical cells independently of any one or more other optical cells, may take the form of either a hollow body species with a light-conveying/directing/redirecting chamber therewithin or a solid body species which relies at least in part on TIR for its light-conveying/guiding capability.

Thus, in more advanced embodiments of luminaires according to the invention in which a plurality of optical cells are provided or used, the light collector element of each of any one or more optical cells may be selected from the above-defined first or second species types independently of the light collector element of the other optical cell(s) of the plurality, whereby different individual ones of the optical cells may comprise either the same or different ones of the above-defined species types of light collector element. Thus, although in many such embodiment luminaires it may be the case that all the optical cells comprise the same species type of light collector element, it may be possible in certain other such embodiment luminaires for one or more of the optical cells to be of one species type and one or more other(s) of the optical cells to be of the other, different species type.

In some of the above embodiments, the light collector element of the first species type may comprise any suitably shaped and/or configured body, housing, casing or container, e.g. of a moulded plastics material, which comprises one or more internal walls defining and enclosing the said internal chamber therewithin. In many practical such embodiments, the chamber may be configured for containing, or for having protruding thereinto, or for having mounted adjacent a lower opening or mouth thereof ("lower" in this context meaning a side of the light collector element distal or remote from the cover element) the respective light source(s) when the components of the final luminaire are fully assembled.

In some of the above embodiments the input opening of the light collector element of the first species type may thus comprise an opening, mouth or aperture in a lower side or basal wall thereof, for receiving and collecting light from the at least one light source associated with that optical cell. Such a lower input opening, mouth or aperture may for example be generally substantially circular in shape, or alternatively may of another suitable shape, e.g. elliptical, polygonal, rectangular, square, etc.

In some of the above embodiments the output opening of the light collector element of the first species type may likewise comprise an opening, mouth or aperture in an upper side or top wall thereof, for propagating light collected from the at least one light source associated with that optical cell and passing through the chamber towards the transmission element. Such an upper output opening, mouth or aperture may for example be generally substantially circular in shape, or alternatively may of another suitable shape, e.g. elliptical, polygonal, rectangular, square, etc. In some such embodiments the shape of the upper output opening, mouth or aperture may be substantially geometrically similar to the shape of the lower input opening, mouth or aperture. Alternatively or additionally, in some such embodiments the upper output opening, mouth or aperture may be substantially larger in diameter or width than the lower input opening, mouth or aperture.

In above embodiments the light collector element of the first species type may for instance be injection-moulded from any suitable plastics material, especially any suitable polymeric material, such as a suitably selected molecular-weight and/or cross-linked variety or species of polymeric substance, examples of which are numerous and readily available in the art of plastics. For example, a polycarbonate (PC) may be one such useful material, although many other examples may also be used instead, such as any of the following: polymethylmethacrylate (PMMA), acrylonitrile-butadiene-styrene (ABS), epoxy resins, glass-reinforced plastic (especially polyester-based) (GRP), polytetrafluoroethylene (Teflon), high density polyethylene (HDPE), polystyrene (PS), high impact polystyrene (HIPS), low density polyethylene (LDPE), polypropylene (PP), melamine formaldehyde (MF), polyamides (e.g. nylons) (PE), phenolic resins (e.g. phenol formaldehyde (PF)), polyacrylonitrile (PAN), polyesters (e.g. unsaturated polyester resin (UPR)), polyethylene terephthalate (PET), polybutylene terephthalate (PBT), polyvinyl chloride (PVC), unplasticized PVC (uPVC), styrene-acrylonitrile (SAN), sheet moulding compounds (SMC) (e.g. sheets of glass fibre impregnated with polyester resin), thermoplastic polyurethanes (TPU), to name but a few.

As an alternative to plastics materials, the light collector element of the first species type may instead be formed from a metal or metal alloy, e.g. steel, aluminium, an aluminium alloy, as well as other metals or alloys with suitable physical properties. Any suitable known manufacturing and/or processing techniques may be used for such metallic light collector elements' production, such as forming (e.g. sheet forming), casting and/or machining production methods.

In some of the above embodiment forms of the or each optical cell, the light collector element of the first species type may comprise at least one reflecting and/or collimating element or feature for reflecting and/or collimating light entering the chamber therewithin from the light source associated with that optical cell and directing or redirecting that light towards the chamber's output opening and thus towards the transmission element, and optionally further onwards towards the cover element (and in particular towards the input opening of the cover element) of that optical cell.

In some such embodiments the at least one reflecting and/or collimating element or feature may comprise one or more of the said internal walls themselves that define the chamber within the light collector element. Such internal walls may thus in some embodiments comprise, or may function as, one or more light-reflecting walls or surfaces and/or one or more internal walls or surfaces that function to collimate light passing through the chamber in the light collector element. The or each internal light-reflecting and/or light-collimating wall or surface may for example be formed of or coated with any suitable light-reflecting material, such as a metal or metal alloy, e.g. consisting of or containing aluminium or alternatively silver or gold, or other light-reflecting and/or light-collimating substance. The light-reflecting coating may typically be applied to one or more internal walls or surfaces of the body, housing, casing or container which forms the main structure of the light collector element, and such coating may be effected by means of any suitable known coating technique, e.g. vacuum deposition, as well as others.

In some of the above embodiments, the one or more internal walls or surfaces of the light collector element of the first species type, especially that/those internal walls or surfaces which are formed of or coated with a light-reflecting and/or light-collimating material, may be of any suitable geometrical shape, especially in their regions or portions between the light collector element's input and output openings, when viewed in plan or in transverse cross-section. For example, a light collector element with internal walls or surfaces of, or configured in, a generally substantially circular shape (when viewed in plan or in transverse cross-section) may typically be employed. However, other internal shapes are possible instead, e.g. elliptical, rectangular, square, polygonal (e.g. hexagonal), etc.

In some such embodiments the general shape—when viewed in plan or in transverse cross-section —of the internal walls or surfaces of the light collector element of the or each optical cell may be substantially geometrically similar to the corresponding shape, also when viewed in plan or in a plane parallel to the said transverse cross-section—of either or both of the upper output opening, mouth or aperture and/or the lower input opening, mouth or aperture of the light collector element.

In some of the above embodiments the internal wall(s) defining the chamber within the light collector element of the first species type may be configured such that the chamber is generally substantially conical, part-conical or frusto-conical in its three-dimensional shape, especially with its diameter/width increasing passing from the light collector element's input opening to its output opening. In other embodiments, however, other three-dimensional shapes of the chamber may be possible instead, by virtue of the chamber's defining internal wall(s) being configured accordingly. Such alternative chamber shapes may for example be generally substantially cylindrical, or pyramidal (especially inverted pyramidal) with any number of sides from 3 upwards (e.g. a pyramid with from 3 to 6 or 7 or 8 sides), or even other geometrical or polyhedral shapes.

In some of the above embodiments of the invention, the light collector element of the second species type may comprise any suitably shaped and/or configured substantially solid body of light-permeable or light-transparent or light-transmissible material, e.g. of a moulded plastics material or a glass, which comprises one or more external walls, especially one or more external side walls, configured so as redirect and/or guide light, or a portion of the light, that has entered the body towards the body's output surface at least in part by virtue of one or more TIR (total internal reflection) phenomena. In some such embodiments the body may, if desired or appropriate, be formed or shaped or configured with at least part of its input surface including at least one recess or indentation for accommodating therewithin, or for having protruding thereinto, or for having mounted thereadjacent, the respective light source(s) associated with that optical cell when the components of the final luminaire are fully assembled.

In some such practical embodiments, the one or more external side walls of the light collector element of the second species type may be shaped or configured in any suitable or appropriate or desired shape or configuration, or combination of shapes or configurations in different portions of said external side wall(s), which act(s) to effect the desired TIR (total internal reflection) phenomena which at least in part serve to redirect and/or guide light, or a portion of the light, that has entered the body towards the body's output surface. Suitable such exterior shapes of any one or more of, or one or more portions of, the TIR solid body side wall(s) may include, for example: conical, part-conical or frusto-conical, paraboloidal, hyperboloidal, cylindrical, pyramidal (especially inverted pyramidal) with any number of sides from 3 upwards (e.g. a pyramid with from 3 to 6 or 7 or 8 sides), or circular or elliptical or polygonal in horizontal or transverse cross-section, or with side wall(s) or one or more portions of one or more side walls being either substantially planar or alternatively curved or arcuate in shape moving from the body's input surface to its output surface with a curve function defined by any suitable/appropriate geometric curve function, especially a curve function that provides the TIR capability.

Suitable materials for forming, e.g. by moulding, the solid body of the or each light collector element of the second species type may be selected from any suitable light-permeable or light-transparent or light-transmissible material, e.g. various plastics materials, such as polycarbonate (PC), polymethylmethacrylate (PMMA), polyethylene terephthalate (PET), or a glass.

In some of the above embodiments the light collector element of either the first or second species types may include support means for supporting the transmission element in the finally assembled optical cell, especially in order to assist in effecting a secure and stable supported mounting of the transmission element, relative to the light collector element and the cover element, in the finally assembled optical cell. Such support means may for example comprise one or more supporting walls, wall portions, ledges, recesses, shoulders, lands or surfaces of, or forming part of, the light collector element.

In some of the above embodiments the light collector element of either the first or second species types may include mounting means for mounting the light collector element on a circuit board or wiring board, or a portion of either thereof, carrying the respective LED(s) (or other light source(s)) for association with that respective optical cell. Such mounting means may take any of various forms: For example:

(i) the mounting means may comprise one or more, e.g. a plurality of or one or more pairs of, pins, spigots, ribs, protrusions, detents, clips, hooks, retaining members/elements, friction-fit or snap-fit elements, or solderable components (e.g. pins, terminals, connectors, electronic components, spring contacts, etc, or even surface-mounted components such as those compatible with "pick & place" technology), or other (inter-) engagement elements, provided on one of the light collector element and a portion of the circuit- or wiring board (usually on the light collector element itself), and a corresponding or appropriate number of one or more holes, apertures, recesses, grooves, channels, notches, or corresponding clip, hook, retainer, friction-fit or snap-fit elements, or solderable components (e.g. pins, terminals, connectors, electronic components, spring contacts, etc, or even surface-mounted components such as those compatible with "pick & place" technology) or other (inter-) engagement elements (for inter-engagement with the aforementioned (inter-)engagement element(s)) provided on the other of the light collector element and the portion of the circuit- or wiring board (usually on the portion of the circuit- or wiring board itself), whereby the light collector element can be united with the circuit- or wiring board through inter-engagement of the respective pairs of inter-engagement elements; and/or (ii) the mounting means may comprise a suitably sized, shaped and positioned land, seating element or portion, or mounting surface on at least one of, optionally both of, the light collector element and a portion of the circuit- or wiring board, via which the light collector element can be adhered to the circuit- or wiring board, e.g. by use of a suitable adhesive (examples of which are well-known in the art and widely commercially available); and/or (iii) the mounting means may comprise one or more sockets (e.g. of metal and/or plastics material), especially a socket provided on one of the light collector element and a portion of the circuit- or wiring board (usually the latter) into which can be plugged a corresponding pin, spigot, protrusion, or other pluggable securement element provided on the other of the light collector element and a portion of the circuit- or wiring board (usually the former).

Where such mounting means is of type (ii) above, in some such embodiments a mounting surface of the light collector element and/or a mounting surface of the portion of the circuit- or wiring board may be furnished with an adhesive layer or one or more adhesive lands/patches. The adhesive may be of any of various known types, such as self-adhesives, UV- or thermally activated adhesives, adhesives resistant to the high temperatures (especially above 80° C.), etc.

In some embodiments, either in addition to or as an alternative to the provision or inclusion of the above-defined mounting means for mounting the light collector element on a circuit board or wiring board (or a portion of either thereof), the cover element may additionally or alternatively be provided with or include auxiliary mounting means, for mounting the cover element onto the circuit board or wiring board (or a portion of either thereof). Where such auxiliary mounting means are provided, they may take any of the same various forms as defined in (i), (ii) or (iii) immediately above for the mounting means for mounting the light collector element on the circuit- or wiring board (or portion of either thereof). Alternatively any other suitable auxiliary mounting means or device(s), e.g. mechanical attachment element(s)/device(s) or an adhesive, may be used instead for the same purpose.

If desired or necessary, in some embodiments of the arrangement or assembly or luminaire of the invention, secondary mounting means may be provided for mounting or securing or attaching the configuring element on or to a circuit board or wiring board, or a portion of either thereof, carrying the respective LED(s) (or other light source(s)) for association with the respective optical cell(s). Such secondary mounting means may take any of the same various forms as defined in (i), (ii) or (iii) immediately above for the mounting means for mounting the light collector element on the circuit- or wiring board (or portion of either thereof). Alternatively any other suitable mounting means or device(s), e.g. screws, bolts or rivets that fix into corresponding holes, or an adhesive, may be used instead for the same purpose.

Thus, in any given such embodiment of the invention in its various aspects, especially those which relate to assemblies with light source(s) on circuit- or wiring board(s) and/or luminaires, the configuring element may comprise such secondary mounting means for the mounting or securing or attaching of the configuring element alone, or with one or more optical cells inserted or mounted in its/their respective aperture(s) therein, onto or to the circuit/wiring board(s) with the light source(s) mounted or pre-mounted thereon, and/or onto or to a body or frame of the luminaire, and/or any other parts of the luminaire. Such secondary mounting means may include, for example, any suitable number and arrangement of mounting holes in the board and/or the configuring element for attaching the configuring element to the board, for example, by screws, directly or through standoffs, or by snap-in, click-in or other interengagement features or components (e.g. pins, connectors, terminals, etc.) protruding from the configuring element and/or the board and which fit into and/or inter-engage with the mounting holes and thereby create a secure connection or attachment (e.g. by a friction fit, or interlocking mechanism) between the board and the configuring element.

If desired or necessary, in some embodiments of the arrangement or assembly or luminaire of the invention, tertiary mounting means may be provided for mounting or securing or attaching the configuring element to a luminaire body or frame, or any other part of the luminaire. Such tertiary mounting means may for example comprise any suitable number and arrangement of tabs or wings or extensions for e.g. sliding the configuring element into a corresponding number and arrangement of slot(s) or channel(s) in the luminaire body or frame (or other luminaire part), or any suitable number and arrangement of mounting holes or apertures (e.g. screw holes) for fastening the configuring element to the luminaire body or frame (or other part thereof). The outer shape of the configuring element (or the relevant portion thereof) may for instance be designed to fit into matching e.g. recess(es), notch(es), channel(s)/groove(s), etc in the luminaire body/frame (or other part thereof).

In addition to such tertiary mounting means, the configuring element may yet further also contain alignment or orientation means such as any suitable number and arrangement of notch(es), recess(es), channel(s)/groove(s), hole(s), aperture(s), tab(s), wing(s), extension(s), pin(s), leg(s), etc which match corresponding counterparts thereto (e.g. of any of the aforementioned types) on the circuit/wiring board and/or in or on the luminaire body or frame (or other part thereof) for enabling the configuring element to fit and be mounted securely into the luminaire and/or to be mounted on the circuit/wiring board in a desired orientation.

Any of the above tertiary mounting and/or alignment/orientation means features on the configuring element may, if desired or appropriate, be preformed into a specific shape. For example, one or more such tab(s), wing(s), extension(s), pin(s), leg(s), etc could be formed with or into a bent configuration so as to form a feature that is more readily or reliably directly mountable or attachable onto the relevant circuit/wiring board or luminaire body/frame (or other part thereof), as may be desired or appropriate to the design of the luminaire.

In practising many of the above embodiments of the invention in its various aspects the one or more light sources (e.g. LEDs) that are employed may generally be provided for use and incorporation into the relevant arrangement(s), assembly(ies) or luminaire(s) or combination(s) with optical cell(s) by virtue of being already mounted or pre-mounted on a circuit board or wiring board (or a portion of either thereof), e.g. a PCB (printed circuit board), prior to actually being mounted into combination with the relevant optical cell(s) or the cell(s) actually being mounted thereon, via the above mounting means.

Such mounting means of type (i) above may inherently also usefully serve as alignment means, for aligning the light collector element into a correct position and/or orientation upon it being mounted on the circuit board or wiring board (or portion thereof).

In some of the above embodiments, especially (though not necessarily) in which the mounting means is of type (i) above where the mounting means comprises one or more pins, spigots, ribs, protrusions, solderable components or similarly shaped (inter-)engagement elements, the mounting means may include or be provided with—or they may themselves also act as—spacer means for defining and setting a predetermined spacing distance between the circuit- or wiring board (or portion thereof) and the light collector element once the latter has been mounted thereon. Such spacer means may comprise, for example, any suitable spacing element, shoulder, flange, collar, leg, pin or other spacing portion.

In some embodiment arrangements within the scope of the invention, the arrangement may include means for forming or creating one or more air gaps or spaces between two or more components of the arrangement once those components have been brought together in the forming of the arrangement for forming into the luminaire. More particularly in various embodiments, for example, the arrangement may include means for forming or creating one or more air gaps or spaces (or series of air gaps or spaces), e.g. of up to around 0.25 or 0.5 or 1 or 2 or 3 or 4 or 5 mm in depth or width, between the components of any one or more of the following pairs of components of the arrangement (where such components are actually provided in the relevant such embodiment arrangement):

(i) an input side of the or each optical cell and the configuring element;

(ii) an input side of the or each optical cell and a circuit board or wiring board carrying the respective light source associated with that respective optical cell;

(iii) an input side of the or each optical cell and the respective light source associated with that respective optical cell;

(iv) one or more side walls of the or each optical cell and the respective light source associated with that respective optical cell;

(v) the configuring element and a circuit board or wiring board carrying the respective light source associated with that respective optical cell.

This provision of such air gap(s) or space(s) between various pairs of components in such various embodiments may be desirable in order to allow or promote air flow around the respective components and thereby help to dissipate or transfer away heat generated from the or each respective light source by convective air flow or even by forced air flow (e.g. using a fan included within the luminaire apparatus), and thus to help prevent or ameliorate a risk of overheating of the or the respective light source and/or the neighbouring/adjacent/surrounding component(s) of the arrangement or luminaire. Alternatively or additionally, the provision of such air gap(s) or space(s) may more simply be for the purpose of preventing the or each respective light source from being enclosed in a substantially air-tight space which could itself lead to overheating of the or the respective light source(s) and/or the neighbouring/adjacent/surrounding component(s) of the arrangement or luminaire.

Further alternatively or additionally, the provision of such air gap(s) or space(s) between, in particular, the configuring element and a circuit board or wiring board carrying the respective light source associated with that respective optical cell may also be desirable in order to allow the formation or creation of extra space in the arrangement for better accommodation of one or more other components which may be present on the respective circuit board or wiring board in addition to the respective light source(s) associated with the respective optical cell(s).

In some practical examples of various of the above embodiments including one or more air gaps or spaces between various pairs of components, the means for forming or creating the one or more air gaps/spaces may comprise one or more (or a plurality of) spacer elements or spacer members. In some such embodiments, the means for forming or creating the one or more air gaps/spaces may comprise one or more pins, spigots, ribs, protrusions, shoulders, flanges, collars, legs or other spacer elements or members provided on either one of, or each of, the components to be spaced apart to define the said respective air gap(s)/space(s). That/those spacer element(s)/member(s) may in certain embodiments be the same such element(s) as constitute the mounting means of type (i) defined above which act as spacer means for defining and setting a predetermined spacing distance between the circuit- or wiring board (or portion thereof) and a light collector element of the respective optical cell. In this latter case, therefore, such spacer means may serve the dual function of providing that mounting and spacing capability as well as creating the desired air gap(s)/space(s) between those two components of the arrangement.

In above embodiments the light collector element of either the first or second species types may include first attachment means, or a component of first attachment means, for mechanically and securely—and optionally also removably—attaching the light collector element to the cover element of the optical cell, with the transmission element secured therebetween. Such first attachment means, or component of such first attachment means, that is provided on the respective light collector element may be provided thereon externally of the body thereof (especially externally of the chamber therewithin when it is of the first species type). Furthermore, any component of such first attachment means that is provided on the respective cover element may be provided thereon externally of the cavity therewithin.

Such first attachment means may take any of various forms: For example, the first attachment means may comprise one or more, especially one or more pairs of or a plurality of, snap-fit connection elements provided on the light collector element which is/are inter-engageable in a snap-fit manner with one or more corresponding snap-fit connection elements provided on the cover element.

Such first attachment means that are constructed or designed so as to render the light collector element removably attachable to the cover element may be particularly useful in some embodiments of the invention where the light collector element is designed or intended to be replaceable or interchangeable with one or more different cover elements, or from one optical cell to another optical cell, especially as may be the case with embodiments of various aspects of the invention which are focused on the luminaire, or the assemblies, or the kits of parts, being of a truly modular nature.

In some example practical forms of such snap-fit-type first attachment means, they may comprise one or more, especially one or more pairs of or a plurality of, elongate legs extending from a wall or attachment portion of one of the light collector element and the cover element, and corresponding one or more, especially one or more pairs of or a plurality of, locating holes or apertures formed in a wall or attachment portion of the other of the light collector element and the cover element. Such leg(s) may for example each include a respective locking or engagement portion, such as a detent, step, notch, hook or catch element, and such hole(s)/aperture(s) may for example each include a respective locking seating, recess, edge, abutment surface or catch feature, for inter-engagement with the aforementioned corresponding snap-fit attachment feature of the respective leg.

In some such embodiments, the elongate leg(s) may be provided on the cover element and the hole(s)/aperture(s) may be provided on the light collector element, although these respective locations of these respective features could be reversed if desired or appropriate.

Where one or more pairs of any such snap-fit-type first attachment features are provided, those respective features within each pair may be located on opposite sides of the light collector and/or the cover element, as the case may be, in order to enhance the stability and secure nature of the attachment.

In some of the above embodiments of the invention in which the or each optical cell is of the above-defined more advanced form, the cover element of the or each optical cell comprises:

- an input opening facing towards the transmission element and for receiving light transmitted by the transmission element,
- an output opening via which light is outputted from the optical cell, and
- at least one internal surface defining a cavity within the cover element between its input and output openings, the cavity's internal surface(s) being configured for allowing or effecting passage of light, or a portion of the light, through the cavity from the cover element's input opening towards its output opening.

It is to be understood that in the cover element of such embodiments, in the context of the above definition of the cover element's cavity's internal surface(s) being configured "for allowing or effecting passage of light, or a portion of the light" through the cavity from the cover element's input opening towards its output opening, within the scope of this definition is intended to be encompassed any form of "allowing or effecting passage" of light, or any portion of the light, through the cover element's cavity by any one or more portions of one or more of the cavity's internal surface(s). In particular any one or more of the following optical effects may be present:

(i) in certain embodiments, one or more internal surfaces, or one or more portions of one or more internal surfaces, of the cavity may be configured for allowing passage or propagation of light, or any portion of the light, through the cavity from the cover element's input opening towards its output opening substantially unhindered, e.g. substantially without any interaction with or impingement or incidence on the or the respective cavity internal surface(s) or surface portion(s);

(ii) in certain embodiments, one or more internal surfaces, or one or more portions of one or more internal surfaces, of the cavity may be configured so as to reflect or redirect or scatter light, or any portion of the light, that interacts therewith or impinges or is incident thereon, as it is conveyed or passes or travels through the cavity from the cover element's input opening towards its output opening;

(iii) in certain embodiments, one or more internal surfaces, or one or more portions of one or more internal surfaces, of the cavity may be configured so as to substantially block or prevent or absorb the passage or travel of light, or any portion of the light, through the cavity from the cover element's input opening towards its output opening, especially that light (or a portion of it) that is so passing or travelling through the cavity at angles (relative to a central axis of the cover element) greater than or beyond one or more predetermined boundary angle(s) (as discussed in further detail below);

(iv) in certain embodiments, any one or more of the effects (i), (ii) and/or (iii) above may be present simultaneously, especially as or when effected by different or discrete portions of the one or more internal surfaces of the cavity or a part thereof.

In some of the above embodiments of the invention in its various aspects, the cover element of the or each optical cell may comprise any suitably shaped and/or configured frame, casing, surround or body, e.g. of a moulded plastics material, which comprises one or more internal surfaces which define and enclose the said internal cavity therewithin.

In some of the above embodiments the said internal cavity within the cover element may be defined by the said internal surface(s) thereof which at least partially unite with or which are at least partially contiguous with or which are at least partially continuations of the wall(s) of the body (or at least an upper portion or upper peripheral region of the body) of the light collector element, especially at least partially continuations of the internal wall(s) of the chamber (or at least an upper portion or upper peripheral region of the chamber) within the light collector element when it is of the first species type.

In some of the above embodiments, in the cover element of the or each optical cell, the at least one internal surface defining the said cavity therewithin between its input and output openings may be configured at least in part not only for simply allowing unhindered passage or propagation of light through the cavity from the cover element's input opening towards its output opening—as per the defined optical effect (i) above—but also—or even alternatively—the at least one internal surface may be configured at least in part for reflecting or redirecting or scattering light incident thereon towards the cover element's output opening—as per the defined optical effect (ii) above.

Alternatively or additionally still, in some other of the above embodiments—as per the defined optical effect (iii) above—the at least one internal surface of the cover element may be configured so as to substantially suppress or block or prevent (e.g. through absorption) passage or propagation through to the cover element's output opening of light rays entering the cavity from the cover element's input opening and which travel in directions defined by angles, relative to a central (or optical) axis direction of the cover element (or relative to a normal axis of the transmission element or a central (or optical) axis direction of the light collector element), greater than one or more predetermined boundary angle(s). Such boundary angle(s) may for instance vary in different radial propagation directions relative to the said axes.

Alternatively or additionally to the preceding feature, in such embodiments the at least one internal surface of the cover element may be configured so as to reflect or redirect or scatter towards the cover element's output opening light rays entering the cavity from the cover element's input opening and which travel in directions defined by angles, relative to a central (or optical) axis direction of the cover element (or relative to a normal axis of the transmission element or a central (or optical) axis direction of the light collector element), greater than one or more predetermined boundary angle(s). Such boundary angle(s) may for instance vary in different radial propagation directions relative to the said axes.

In the above-defined various embodiments involving one or more predetermined boundary angle(s)—which defines the maximum angle of direction of travel at which light rays entering the cavity from the cover element's input opening are able to pass or propagate through the cavity to its output opening without being suppressed, blocked, prevented, or without being reflected or redirected or scattered back into the cavity or towards the cover element's output opening—may be selected according to the overall dimensions, shape, configuration and design of the cover element and/or of the optical cell in question. However, by way of example, in some currently envisaged practical embodiment optical cells within the scope of the invention, a predetermined boundary angle of around 1 or 5 or 10 or 15 or 20 or 25 or 30 or 35 or 40 or 45 or 50 or 55 or 60 or 65 or 70 or 75 or 80 or 85 or 88 or 89° or <90°, or a boundary angle in a range between any two of the aforesaid angles, relative to a central (or optical) axis direction of the cover element (or relative to a normal axis of the transmission element or a central (or optical) axis direction of the light collector element), may be suitable. In certain embodiments, it may be possible for different such boundary angles to apply at different radial propagation directions (relative to the said axes) at which light rays may pass or propagate through the cavity and be so suppressed, blocked, prevented, or reflected or redirected or scattered back into the cavity or towards the cover element's output opening as they propagate radially in those different respective radial propagation directions.

In the preceding definitions, the "central (or optical) axis direction of the cover element" may be defined as an axis perpendicular or normal to a plane of the circuit- or wiring board upon which the optical cell in question is to be mounted, or as a normal to the plane of the input or output (or input or output openings, as the case may be) of the cover or the light collector element, or as a normal to the transmission element surfaces (or its general plane).

The cover element may, as with the light collector element but independently thereof, for instance be injection-moulded from any suitable plastics material, especially any suitable polymeric material, such as a suitably selected molecular-weight and/or cross-linked variety or species of polymeric substance, examples of which are numerous and readily available in the art of plastics. For example, a polycarbonate (PC) may be one such useful material, although many other examples may also be used instead, such as any of the following: polymethylmethacrylate (PMMA), acrylonitrile-butadiene-styrene (ABS), epoxy resins, glass-reinforced plastic (especially polyester-based) (GRP), polytetrafluoroethylene (Teflon), high density polyethylene (HDPE), polystyrene (PS), high impact polystyrene (HIPS), low density polyethylene (LDPE), polypropylene (PP), melamine formaldehyde (MF), polyamides (e.g. nylons) (PE), phenolic resins (e.g. phenol formaldehyde (PF)), polyacrylonitrile (PAN), polyesters (e.g. unsaturated polyester resin (UPR)), polyethylene terephthalate (PET), polybutylene terephthalate (PBT), polyvinyl chloride (PVC), unplasticized PVC (uPVC), styrene-acrylonitrile (SAN), sheet moulding compounds (SMC) (e.g. sheets of glass fibre impregnated with polyester resin), thermoplastic polyurethanes (TPU), to name but a few.

As a possible alternative or addition to, although possibly it may be the same thing as, the above defined optical effect (iii) of the cover element, in some of the above embodiments—if desired or appropriate—the cover element may include one or more anti-glare features. Such features may be designed to eliminate or reduce glare when the light emitted from the optical cell reaches an observer (or viewer), or to prevent or limit light emitted from the optical cell from reaching certain areas in space, or objects or surfaces, outside the optical cell. In some such embodiments, such an anti-glare feature may be constituted by one or more internal walls or surfaces of the cover element having an extended height or upward length (e.g. a height at least that of the height of the light collector element or the distance between the respective light source(s) of that optical cell and a base of the cover element when the optical cell is fully assembled, or a height up to about 1.5 or 2 or 2.5 or even as much as 3 times the height of the light collector element or the distance between the respective light source(s) of that optical cell and a base of the cover element when the optical cell is fully assembled) and being configured so as to have one or more internal walls or surfaces which are oriented at an angle, relative to a central (or optical) axis of the optical cell (especially an axis perpendicular or normal to a plane of the circuit- or wiring board upon which the optical cell in question is to be mounted) of ≥0°, especially in the range of from about 0 or 5 or 10 or 15 or 20 or 30° up to about 50 or 60 or 70 or 80°. As a result of this configuration of the internal wall(s) or surface(s) of the cover element, light rays emanating from the light source associated with that optical cell and being conveyed or directed by the light collector element through the transmission element and into the cavity within the cover element (via the latter's input opening) and towards the cover element's output opening, at an exit angle beyond a certain maximum angle value (namely, an angle dependent on the actual aforementioned wall orientation angle and/or in conjunction with the height of the cover element wall(s)) may be blocked, cut out or (at least partially) absorbed by the cover element's wall material and thereby prevented from exiting the optical cell and causing unwanted glare.

Generally in this context, in various such embodiments there may be no limit on the shape of the cover element and its internal walls, which may in various cases be of any shape in two or three dimensions (or in plan or cross-section) (including flat, planar, curved, arcuate, regular, irregular, symmetrical, asymmetrical, complex-curved, conic-sectioned, etc), provided it blocks or reduces, redirects or scatters at least a portion of the light exiting the transmission element so as to reduce glare when the light emitted from the optical cell reaches the observer (or viewer), or to prevent or limit light emitted from the optical cell from reaching certain areas in space, or objects or surfaces, outside the cell. To assist this, in some embodiments the inner wall(s) of the cover element may even be curved or arcuate, and/or they may be glossy to assist in their redirecting or reflection function or to help reduce scatter of residually reflected light from the wall(s).

By way of example, such a slope or angle of inclination away from the vertical (i.e. away from the axis direction of the optical cell) of the internal wall(s) of the cover element in the region of about 20 to 30° may be suitable for blocking such exiting light rays beyond a certain angle value of, say, about 60°, which may be suitable for many anti-glare applications. However, the exact angle of slope or inclination away from the vertical (i.e. away from the axis direction of the cell) of such internal wall(s) of the cover element in any specific practical embodiment of optical cell may be selected so as to suit or match the particular dimensions, shape and light distribution characteristics of the specific optical cell in question.

It may be possible, in some of the above embodiment implementations of the invention, especially in the kits of the seventh aspect, to provide a plurality of differently configured cover elements for selective use singly with a single given light collector element and transmission element of a given optical cell, wherein each differently configured cover element may have a different angle of slope or inclination of its internal wall(s)/surface(s) and thus a different degree of anti-glare properties in terms of the light ray exit angle beyond which the exiting light rays are blocked. Such plural cover elements, per single given light collector element and transmission element, may thus enhance the modular versatility of some embodiment kits within the scope of these aspects of the invention.

In some of the above embodiments, the cover element of the or each optical cell may, as with the light collector element but independently thereof, have one or more internal walls or surfaces—including those providing the above anti-glare feature—which are of any suitable geometrical shape when viewed in plan or in transverse cross-section. For example, a cover element with internal walls or surfaces of, or configured in, a generally substantially circular shape (when viewed in plan or in transverse cross-section) may typically be employed. However, other internal shapes are possible instead, e.g. elliptical, rectangular, square, polygonal (e.g. hexagonal), etc.

In some of the above embodiments the internal surface(s) defining the cavity within the cover element may be configured such that the cavity is generally substantially part-conical or frusto-conical or part-paraboloidal or part-hyperboloidal in its three-dimensional shape, especially with its diameter/width increasing passing from the cover element's input opening to its output opening. In other embodiments, however, other three-dimensional shapes of the cavity may be possible instead, by virtue of the cavity's defining internal surface(s) being configured accordingly. Such alternative cavity shapes may for example be generally substantially cylindrical, spherical, ellipsoidal, paraboloidal, hyperboloidal, etc, or pyramidal (especially inverted pyramidal) with any number of sides from 3 upwards (e.g. a pyramid with from 3 to 6 or 7 or 8 sides), or even other geometrical or polyhedral shapes.

As already mentioned above, in some of the above embodiments the cover element of the or each optical cell may include one or more, or one or more pairs of, or a plurality of, elements or components of snap-fit-type attachment means for securely attaching the cover element of the optical cell to the light collector element thereof. Such elements or components of snap-fit-type attachment means, e.g. one or more pairs of or a plurality of, elongate legs extending from a wall or attachment portion of the cover element (especially including a respective locking or engagement portion, e.g. a detent, step, notch, hook or catch element) may thus be as already defined above.

In some of the above embodiments of the invention in which the or each optical cell is of the above-defined more advanced form, the transmission element of the or each optical cell comprises:

one or more planar optical elements, wherein the or each optical element includes a first surface facing towards the output of the light collector element and a second surface facing towards the input opening of the cover element, and the or each optical element exhibits a predetermined optical activity or function in its transmission of light incident thereon which has exited the output of the light collector element and is transmitted by the transmission element towards the input opening of the cover element.

In some of the above embodiments of the invention in its various aspects, the transmission element of each optical cell may comprise at least one optically active transmission optical element, such as in the form of a generally flat or planar foil, film, sheet, web, plate, layer or other thin body of optical material exhibiting a desired optical function. That optical function may be any optical function which effects or facilitates a desired distribution and/or one or more output characteristics of light emanating from the respective optical cell, such as by modifying or modulating one or more optical properties (especially directional optical properties) of the light emitted by the respective light source(s) as determined by the optical function of the respective optically active transmission element of the respective optical cell. (Of course, it is within the scope of the invention, in certain embodiments, that the optical function of the transmission element may be, in effect, "zero", such that the transmission element may not substantially alter or interfere with the natural passage of light therethrough, whereby the light from the light source(s) may pass directly to the cell's output (optionally having been directed or redirected (e.g. reflected) from any surface or wall (which may be internal or external, depending on the species type) of the body of the light collector element) via the transmission element.)

In many of the above embodiments the transmission element may be permeable to light, such that it transmits light incident thereon from the respective light source(s) in the respective optical cell and transmits it to the optical cell's output, e.g. in the form of a desired ray or beam of appropriate desired direction, shape, intensity, colour and/or other light property characteristics, which output will normally be via the output opening of the cover element attached to the light collector element.

In many of the above embodiments the transmission element may comprise a said first surface, which is a first major face thereof, and a said second surface, which is a second major face thereof, and at least one of said first and second surfaces, optionally each of said first and second surfaces, comprises or is formed with optical functional relief, especially optical functional relief of a nanometer(s) or micrometer(s) order of size, and more especially nano- or micro-relief which displays either diffractive or refractive behaviour, or a combination of diffractive and refractive behaviour. Suitable sizes of such surface relief features may for example be in the overall range of from about 0.5 or 1 nm up to about 500 μm, with suitable sizes of such surface nano-relief features being for example in the range of from about 0.5 or 1 nm up to about 500 nm, e.g. from about 1 or 2 or 3 nm up to about 10 or 20 or 50 or 100 or 250 nm, and/or suitable sizes of such surface micro-relief features being for example in the range of from about 0.5 or 1 μm up to about 500 μm, e.g. from about 1 or 2 or 3 μm up to about 10 or 20 or 50 or 100 or 250 μm.

Specific examples of surface nano-scale and/or micro-scale optical functional relief, and techniques for how to create or apply it to a variety of optical substrate materials—such as various embossing processes—are all widely known in the art of optics, especially micro-optics and holography, and will be within the general skill and knowledge of the skilled person.

For use in above embodiments of the invention, suitable substrate materials for use in forming the transmission element may include various plastics or polymeric materials, such as polycarbonates, UV-curable polymers, acrylic polymers, or alternatively a glass. Alternatively still, plural-layer such transmission elements may instead be used, if that is appropriate, and such plural layers may each independently comprise a substrate material of any of the foregoing materials. Moreover, any one or more of, or even each of, such plural layers in a plural-layer transmission element structure may be provided with an optically functional relief pattern.

The nano- or micro-structure may be directly formed in the substrate material or on its surface, e.g. by molding or embossing or UV-curing or an etching process, or it may be formed in a different material which is then attached to the substrate material via any suitable means or method, e.g. by UV-curing a curable polymer on a glass or plastic substrate and then laminating or gluing the structured material (or film) to the substrate surface.

Die-cutting or any other suitable known technique (e.g. laser cutting, slitting, etc) may for example be used to form any desired shape and size of the transmission element. Transmission element shapes being generally substantially rectangular or square may be typical, although other shapes (e.g. circular, elliptical, polygonal, etc) may be possible. The exact shape of the transmission element in any given embodiment may depend on the overall plan (or transverse-sectional) shape and dimensions of the other optical cell components, i.e. the light collector element and the cover element.

In many of the above embodiments the or each planar optical element of the transmission element may be of substantially uniform or constant thickness.

Suitable thicknesses of the substrate material for forming the or each optical element of the transmission element may be in the range of from about 1 or 5 or 10 or 20 or 30 or 40 or 50 or 100 up to about 300 or 400 or 500 or 800 or 1000 μm, e.g. around 250 μm in some practical example embodiments.

If desired or appropriate, the transmission element may be cut or shaped to include any suitable number of peripheral indents, notches, recesses, channels, or cut-outs, for the purpose of accommodating and allowing to extend therepast any elements or components of snap-fit-type attachment means, e.g. one or more (or any plurality of) elongate legs, that extend between the cover element and the light collector element for the purpose of attaching those two elements together, especially with the transmission element securely and stably trapped or clamped therebetween.

Thus in many practical above embodiments of optical cells within the scope of the invention, once the cover element has been attached to the light collector element, the transmission element may be stably and securely mounted therebetween by virtue of being trapped or clamped between those two elements, especially by means of respective clamping surfaces (or surface portions), walls (or wall portions) or abutment features on the respective cover element and light collector element.

If desired or appropriate, in optical cells according to embodiments of the invention, any optical cell may incorporate one or more auxiliary optical elements or components, e.g. one or more lenses, diffusers, micro- or nano-structured elements or films or foils, or glare reduction elements etc, which may also play a part in defining the overall final light output of the respective optical cell, such as by modifying or modulating one or more optical properties of light emitted by the respective light source(s) and passing to the optical cell's output, as determined by an optical function of the respective auxiliary optical element(s)/component(s) of the respective optical cell. Such one or more auxiliary optical elements/components may, if provided, be mounted between the light collector element and the cover element, e.g. adjacent the transmission element, or attached directly (or indirectly) to the light collector element or the cover element.

In many embodiments of the invention in its broadest sense and in its various aspects, the configuring element may comprise, or may be in the form of, a sheet, plate or film, especially a sheet, plate or film of substantially uniform thickness. In some such embodiments the sheet, plate or film may be substantially planar or flat. Alternatively in other embodiments the sheet, plate or film may be curved or arcuate in three dimensions (or it may be formable into such a curved or arcuate shape), e.g. so as to conform to any desired geometric shape function.

Typical thicknesses of the sheet, plate or film material may for example be in the approximate range of from about 0.2 or 0.3 or 0.4 or 0.5 or 1 up to about 3 or 4 or 5 mm. Suitably the configuring element may for example be die-cut (or alternatively prepared by means of sawing, machining, laser-cutting or water-jet-cutting) from a stock sheet, plate or film of the relevant material, the die-cutting being such as to form the required shape and configuration of the configuring element with the predetermined pattern or arrangement of apertures actually formed therein.

In some such embodiments the sheet, plate or film may be of a sufficient thickness, and/or formed of a suitable material, such that the sheet, plate or film is of sufficient strength and rigidity so as to be able to substantially hold its own shape in space, especially as a flat planar shape or alternatively as an arcuate or curved-in-three-dimensions shape, i.e. in either case without significant bending or distortion, and also so as to provide a substantially rigid and firm mounting for the various optical cells received in the apertures therein.

Alternatively in other embodiments the sheet, plate or film may have a small or medium degree or amount of flexibility and/or resilience, e.g. in order to be able to adopt or conform to a desired non-planar, e.g. arcuate or curved-in-three-dimensions, shape or configuration when mounted within the body or frame of the luminaire. In certain embodiments, for example when the configuring element is made from metal or metal alloy (e.g. sheet metal/alloy), the non-planar shape may be achieved by preforming the sheet into the desired form or configuration by any suitable known method.

In many typical embodiments the material of the configuring element may be, or may comprise, a plastics material, especially any suitable polymeric material, such as a suitably selected molecular-weight and/or cross-linked variety or species of polymeric substance, examples of which are numerous in the art of plastics. The polymer may for instance be or comprise a thermoplastic or thermosetting polymer. By way of example, some suitable polymeric materials, which may be used either singly or any combination, may include any of the following: polycarbonates (PC), polymethylmethacrylate (PMMA), acrylonitrile-butadiene-styrene (ABS), epoxy resins, glass-reinforced plastic (especially polyester-based) (GRP), polytetrafluoroethylene (Teflon), high density polyethylene (HDPE), polystyrene (PS), high impact polystyrene (HIPS), low density polyethylene (LDPE), polypropylene (PP), melamine formaldehyde (MF), polyamides (e.g. nylons) (PE), phenolic resins (e.g. phenol formaldehyde (PF)), polyacrylonitrile (PAN), polyesters (e.g. unsaturated polyester resin (UPR)), polyethylene terephthalate (PET), polybutylene terephthalate (PBT), polyvinyl chloride (PVC), unplasticized PVC (uPVC), styrene-acrylonitrile (SAN), sheet moulding compounds (SMC) (e.g. sheets of glass fibre impregnated with polyester resin), thermoplastic polyurethanes (TPU), to name but a few.

Alternatively the material of the configuring element may be a metal or a metal alloy (e.g. aluminium or an aluminium alloy). Any suitable known manufacturing and/or processing techniques may be used for such metallic configuring elements' production, such as forming (e.g. sheet forming), and/or machining production methods.

In many practical embodiments the material of the configuring element may be an optically inactive material, meaning that the material substantially does not perform or exhibit any significant degree of optical functionality of the nature of diffraction, refraction or other modification of the wavelength, phase, directional or intensity characteristics of transmitted or reflected light passing through or incident on the configuring element. Thus, in such practical embodiments the material of the configuring element may substantially not contribute in any significant way to the overall optical functionality of the or each optical cell of the arrangement, assembly or luminaire.

In some embodiments the configuring element may comprise alignment means for defining and/or facilitating appropriate or correct positioning and/or orientation of the configuring element, or the arrangement or assembly comprising it (together with the respective optical cell(s), in the body or frame of the luminaire into which it is, or is to be, incorporated. Such alignment means may for example comprise any suitable number of (e.g. one, two, three, four, five, six, or possibly even more than six) and spatial or configurational arrangement of lugs, tabs, wings, flanges, ribs, collars, detents, pins, protrusions, holes, recesses, channels, grooves, notches, etc, which may for example (especially in the case of a plurality thereof) be located on opposite or opposed or spaced-apart sides or portions of the configuring element.

In practical embodiments of the invention in its various aspects, the or each aperture in the configuring element may be shaped and/or configured to receive therein a respective one of the optical cells. At least part of the defining wall(s) of the or each aperture in the configuring element may substantially geometrically match or duplicate the external shape of at least part of the respective optical cell—such as, in particular, at least part of the respective housing, body, casing or container in the case of the relatively basic embodiment forms of optical cell(s), or at least part of the respective light collector element or cover element.in the case of the relatively more advanced embodiment forms of optical cell(s)—especially so that the respective optical cell may be retained in its respective aperture in the configuring element by means of a simple friction fit. Alternatively, in other embodiments, each optical cell may be receivable and securable in its respective aperture in the configuring element by virtue of respective securement, retention or locking means, e.g. one or more locking detents, clips, pins, lugs, hooks or other suitable mechanical securement/retention/locking elements or devices.

However, in some embodiments at least part of the defining wall(s) of the or each mounting aperture in the configuring element, together with at least part of an external wall of the respective optical cell (such as, in particular, at least part of an external wall of the respective housing, body, casing or container in the case of the relatively basic embodiment forms of optical cell(s), or at least part of an external wall of the respective light collector element or cover element in the case of the relatively more advanced embodiment forms of optical cell(s), may collectively comprise one or more orientation means for effecting reception of the respective optical cell (or relevant part or element thereof) in the respective aperture in any selected one of one or two or a plurality of specific discrete or fixed possible orientations relative to each other. Such one or two or more possible orientations may for instance be defined by the rotational symmetry of the respective optical cell. Such orientation means may for example comprise any suitable number of, especially any suitable number of pairs of, mutually inter-engageable inter-engagement elements or features provided on each of the external wall of the respective optical cell (or relevant part or element thereof) and the defining interior wall(s) of the respective aperture. Practical examples of such orientation means may include any suitable number, positioning and spatial arrangement of inter-engageable lugs, tabs, wings, flanges, ribs, collars, detents, pins, protrusions, holes, recesses, channels, grooves, notches, etc.

Furthermore, in some embodiments of the invention the or each optical cell may further comprise attachment means, or a component of attachment means, for mechanically and securely—and optionally also removably—attaching the optical cell to the configuring element. Such attachment means, or component of such attachment means, that is provided on the respective optical cell may be provided thereon externally thereof.

Such attachment means may take any of various forms: For example, the attachment means may comprise, as already mentioned above, a simple friction-fitting engagement between an outer wall of (e.g. an outer wall of a lower or an upper portion of) the respective optical cell and the defining wall(s) of a respective mounting aperture in the configuring element.

Alternatively the attachment means may comprise one or more, especially one or more pairs of or a plurality of, snap-fit connection or docking elements provided on the optical cell which is/are inter-engageable in a snap-fit manner with one or more corresponding snap-fit connection or docking elements provided on the configuring element. The one or more corresponding snap-fit connection or docking elements provided on the configuring element may be provided adjacent a respective mounting aperture in the configuring element into which the respective optical cell is to be mounted. In some example practical forms of such snap-fit-type attachment means, they may comprise one or more, especially one or more pairs of or a plurality of, legs, pins, spigots or protrusions extending from a lower wall or lower attachment portion of the respective optical cell, and corresponding one or more, especially one or more pairs of or a plurality of, locating holes, apertures or recesses formed in the configuring element, especially formed therein adjacent the respective mounting aperture therein into which the respective optical cell is to be mounted. Such leg(s)/pin(s)/spigot(s)/protrusion(s) may for example each include a respective locking or engagement portion, such as a detent, step, notch, hook or catch element, and such hole(s)/aperture(s)/recess(es) may for example each include a respective locking seating, recess, edge, abutment surface or catch feature, for inter-engagement with the aforementioned corresponding snap-fit attachment feature of the respective leg/pin/spigot/protrusion. In some such embodiments, the leg(s)/pin(s)/spigot(s)/protrusion(s) may be provided on the respective optical cell and the hole(s)/aperture(s)/recess(es) provided on the configuring element, whereas in alternative such embodiments the locations of these respective snap-fit docking components may be reversed so that the leg(s)/pin(s)/spigot(s)/protrusion(s) are provided on the configuring element and the hole(s)/aperture(s)/recess(es) are provided on the respective optical cell.

Further alternatively the attachment means may comprise a mechanically simpler docking-type inter-engagement, in which each one of the respective optical cell and the configuring element is provided with a respective one of a pair of mutually inter-engageable detents, hooks, catches, clips or other docking inter-engagement elements, whose mechanical inter-engagement together effects the docking inter-engagement of the respective optical cell and the configuring element. Plural such pairs of mutually inter-engageable docking elements may be provided, if desired or appropriate, e.g. located on opposite sides of the respective optical cell and adjacent opposite sides of the respective mounting aperture in the configuring element, for enhancing the security and stability of the docking mounting of the respective optical cell on the configuring element.

Yet further alternatively still, the attachment means may comprise one or more, especially a plurality of or one or more pairs of, snap-fit or click-in or other interconnection or docking or hooking or locking elements provided on the respective optical cell alone (or even on the configuring element alone), e.g. in a form of a sprung hook device which when pushed through an aperture in the configuring element, springs out and catches the edge of the aperture in a locking manner. Other types of such snap-fit or click-in or docking/hooking/locking devices or element may of course be possible.

In some embodiments the or each optical cell may be readily removable from its respective aperture in the configuring element, such as for the purpose of dismantling of the arrangement/assembly/luminaire for any reason or for the replacement or repair of any of its components. Alternatively, in other embodiments, each optical cell may be substantially non-removable from its respective aperture in the configuring element, i.e. it may be substantially permanently mounted therein.

In some embodiments of the invention in its various aspects, the configuring element may comprise a plurality of the said mounting apertures, and the apertures may be arranged or mutually configured across the area of the configuring element, especially across at least a central region of the configuring element, in any suitable or desired pattern, distribution or geometric arrangement, such as for instance as may be dictated by the final desired arrangement of the various light sources in the various optical cells in the light-emitting area(s)/region(s) of the final complete luminaire's design. For example, the apertures in the configuring element may be spatially distributed across the configuring element (or across a central region thereof) in one or more linear, polygonal, rectangular, hexagonal, radial, circular, spiral, or even randomized arrangements. Generally however the exact spatial arrangement of the apertures may be dictated by the overall design of the finished complete luminaire.

Furthermore, in practising some such embodiments of the invention in its various aspects, the plurality of apertures, and thus the plurality of light sources, may be spatially and/or functionally arranged in or on the configuring element in a plurality of discrete groups, series, clusters or arrays. By "spatially arranged in a plurality of discrete groups/series/clusters/arrays" in this context is meant that one or more individual such groups, series, clusters or arrays is/are located in a or a respective discrete section or region of the configuring element which is different from or spaced apart from the other section(s) or region(s) of the configuring element in which is/are located the other group(s), series, cluster(s) or array(s). By "functionally arranged in a plurality of discrete groups/series/clusters/arrays" in this context is meant that one or more individual such groups, series, clusters or arrays is/are either (i) operable independently of one or more of the other groups, series, clusters or arrays, and/or (ii) designed and/or constructed to exhibit different lighting characteristics and/or different optical functions from one or more of the other groups, series, clusters or arrays. In embodiments designed with this "functional" independence between plural groups, series, clusters or arrays, appropriate control over the individual groups', series', clusters' or arrays' operation may be effected by appropriate switching and/or electronic control means. By providing the various plural yet spatially and/or functionally discrete groups, series, clusters or arrays of apertures/light sources in this manner, greater flexibility and variation in the overall optical functionality, lighting characteristics and aesthetics of the complete luminaire may be achievable, which may add to the overall design versatility of luminaires in accordance with the present invention.

In any given embodiment of the invention in its various aspects, the number of optical cells may be up to the same number as, or may be less than, the number of mounting apertures in the configuring element. Thus, in some embodiments of the invention in its various aspects, substantially all of the apertures in the configuring element may each have a respective optical cell received therein. However, in other embodiments, still within the scope of the invention, it may be possible for one or more of the apertures in the configuring element to be empty and not have a respective optical cell received therein. Such latter embodiments may be particularly useful for example in the provision of certain designs of modular luminaires in the form of kits which may have enhanced versatility by virtue of the configuring element being made and provided in a single given design but is able to be combined with various different numbers of optical cells, so that a range of different complete luminaires may be constructable having a wider range of final designs or brightnesses or other lighting characteristics, whilst the number of different versions of the overall kit components is kept to a minimum.

Within the scope of this specification it is envisaged that the various aspects, embodiments, examples, features and alternatives, and in particular the individual constructional or operational features thereof, set out in the preceding paragraphs, in the claims and/or in the following description and accompanying drawings, may be taken independently or in any combination of any number of same. For example, individual features described in connection with one particular embodiment are applicable to all embodiments, unless expressly stated otherwise or such features are incompatible.

BRIEF DESCRIPTION OF THE DRAWINGS

Various embodiments of the present invention in its various aspects will now be described in detail, by way of example only, with reference to the accompanying drawings, in which.

DETAILED DESCRIPTION OF EMBODIMENTS

Embodiments of the present invention provide a modular system of components for use in constructing luminaires, and are based on the use of a non-optically-active low-cost configuring element for arranging optical cells into arrays of various shapes, sizes and layouts, whilst keeping the optical cells together as a stand-alone multi-element arrangement of optics before being installed onto a LED-containing circuit or wiring board or into a luminaire body or frame. Each optical cell may comprise one or more LEDs, and optionally also one or more auxiliary optical elements—such as one or more transmission elements (with a predetermined optical activity or function, such as from nano-scale optical functional relief on one or more faces/surfaces of the transmission element, in its transmission of light incident thereon as the light is conveyed or propagates through the optical cell from the respective light source to the cell's output), reflectors, lenses, diffusers, micro- or nano-structured elements or films or foils, glare reduction elements, etc—whereby the overall assemblage of optical components can represent or be assembled into individual optical cells each being designed and configured to redistribute light from each respective light source (LED), and from the light sources (LEDs) collectively, into a desired final output light distribution of the complete, finished luminaire. Within luminaires according to embodiments of the invention, therefore, the optical cells can be spatially distributed according to the luminaire's design. They can form any type of regular or irregular arrangement, such as linear, rectangular, hexagonal, radial, randomized etc.

Figure 1:
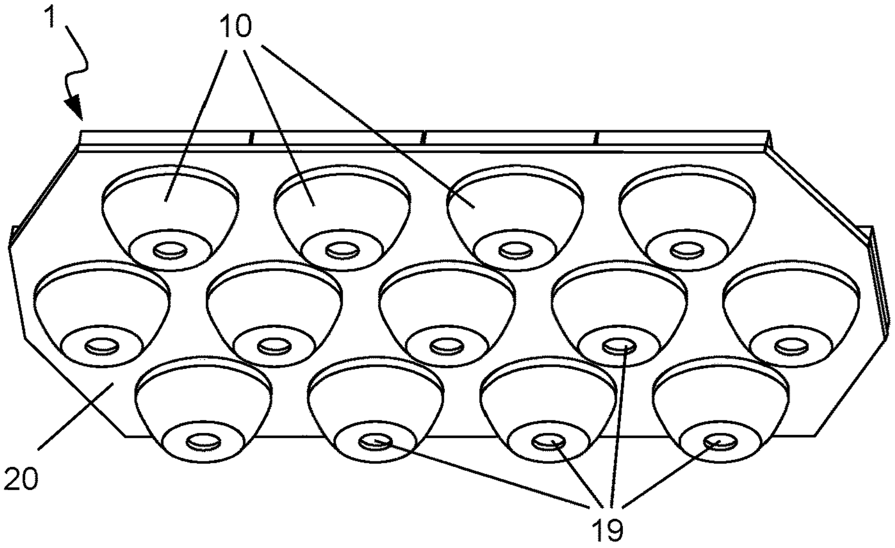
FIG. 1 is a perspective view of an arrangement for forming into a luminaire, in accordance with one embodiment of the invention.
Figure 2:
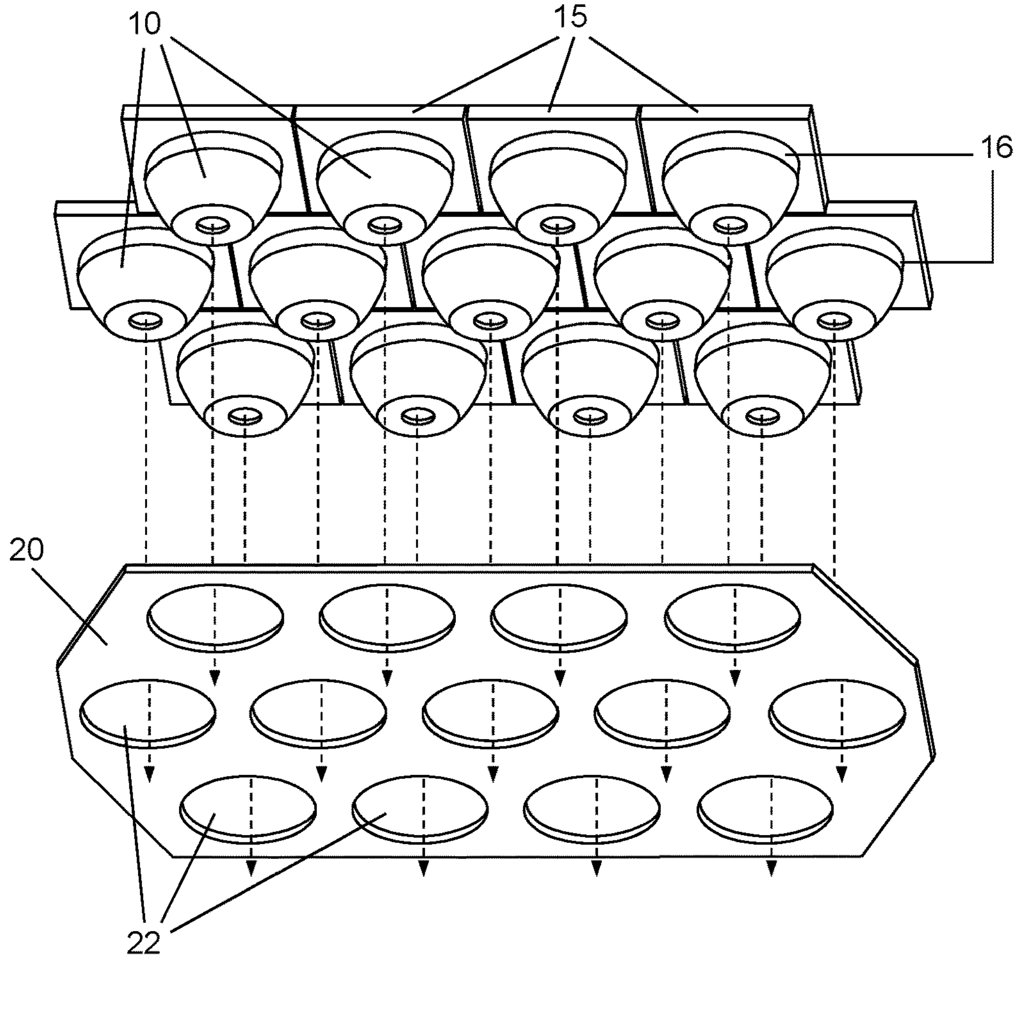
FIG. 2 is an exploded perspective view of the arrangement of FIG. 1, illustrating the manner in which the array of optical cells and the configuring element are brought together so that the respective optical cells are received in the respective mounting apertures of the configuring element.
Figure 5:
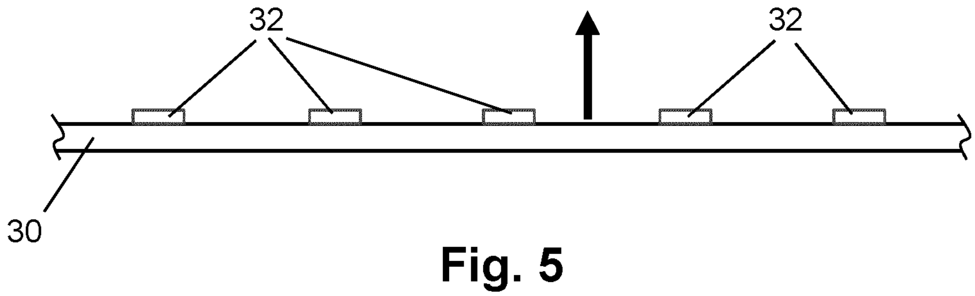
FIG. 5 is a side-on sectional view of a circuit or wiring board on which are pre-mounted the various LEDs of the luminaire, showing the manner in which the LED board is brought together with the optical cells+configuring element arrangement in the formation of the complete luminaire.

Referring firstly to FIGS. 1 and 2, here there is shown one embodiment arrangement 1 for forming into a luminaire, comprising an array of optical cells 10, each optical cell 10 including a housing or body 14 (attached to which is a cover element 15—see FIG. 3) for containing or having inserted or mounted or positioned therein, thereon or thereadjacent—e.g. in or adjacent a chamber therewithin which is accessible via a lower hole or aperture 19—a respective LED 32, which LEDs 32 will usually be provided pre-mounted on a circuit board or wiring board 30 (as shown in FIG. 5). The optical cells 10 are arranged and held in a predetermined relative configuration or pattern by virtue of each being received and held in a respective mounting aperture 22 of a configuring element 20, which is in the form of a die-cut flat sheet or plate of a suitably strong and rigid plastics material. Typically the apertured flat sheet or plate has a thickness of around 1 to 2 mm, although its exact optimum thickness may depend on the material from which it is formed. Each optical cell 10 is mounted securely in its respective aperture 22 in the configuring element 20 by virtue of a simple friction fit, owing to the matching size and shape of the interior walls defining each aperture 22 and the exterior shape and dimensions of each optical cell's housing or body 14. Alternatively any suitable form of snap-fit or click-in docking arrangement could be used instead for securely—and possibly also removably—mounting each respective optical cell housing/body 14 in a respective mounting aperture 22 of the configuring element 20.

Figure 3:
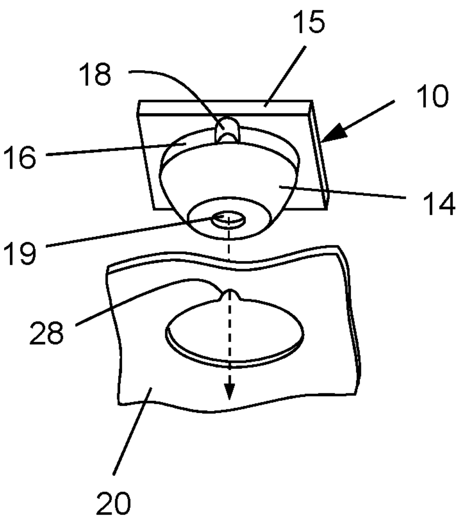
FIG. 3 is a perspective view of part of a modified arrangement, similar to that of FIG. 1, but showing an alternative embodiment in which, in each optical cell's means of mounting in the configuring element, a pair of interengagement features are included in order to fix the respective optical cell in a unique rotational orientation relative to its respective mounting aperture in the configuring element.

As shown in FIG. 3, in a particularly useful embodiment, the mounting of each optical cell 10 in its respective aperture 22 of the configuring element 20 comprises a pair of interengageable elements in the form of a lug or tab 18 provided on an exterior upper wall portion 16 of the respective cell housing/body 14 and a notch or recess 28 formed in an interior wall portion of the respective aperture 22 of the configuring element 20. These mounting lug/tab 18 and notch/recess 28 features thus enable each respective optical cell 10 to be fixed in a unique rotational orientation relative to its respective aperture 22 in the configuring element 20.

Figure 4:
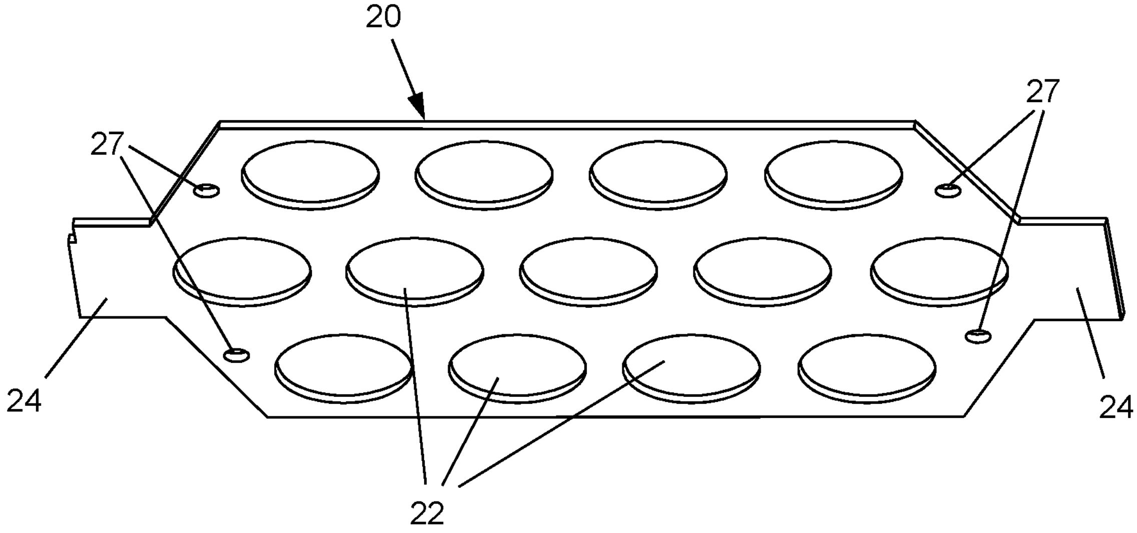
FIG. 4 is a perspective view of a modified form of configuring element, similar to that shown in the arrangement of FIG. 1, but of an alternative shape in which the configuring element includes various mounting and orientation/alignment features to assist its correct and stable mounting in a luminaire body or frame.

FIG. 4 shows a modified form of configuring element 20, similar to the simpler form thereof shown in FIGS. 1 to 3, but in which the configuring element 20 includes a series of mounting holes 27, for locating on respective corresponding/matching mounting pins or spigots (not shown) provided at appropriate locations on the luminaire body or frame, and a pair of oppositely arranged or diametrically spaced-apart locating tabs or wings 24, for location in corresponding recesses or notches at appropriate locations on the luminaire body or frame. Thus, together the various mounting holes 27 and locating tabs/wings 24 constitute alignment and orientation features for assisting the correct and stable mounting of the configuring element 20, with its optical cells 10 mounted thereon, in the luminaire body or frame.

FIG. 5 shows an example of a circuit board or wiring board 30 on which are pre-mounted, in a conventional manner, an array of the LEDs 32 which are arranged in the appropriate same, matching or corresponding predetermined pattern or arrangement as the optical cell mounting apertures 22 in the configuring element 20. Thus, as the board 30 is brought together (as represented by the arrow in FIG. 5) with the arrangement of optical cells 10 carried on the configuring element 20, the respective LEDs are able to protrude through—or to protrude just into or to come to be positioned immediately adjacent (i.e. just outside or just inside) the mouth of—the respective lower holes 19 in the respective optical cell housings/bodies 14, and in some case into (or a short distance into) the respective chambers therewithin, so as to adopt their appropriate correct and final positionings within each respective optical cell for completing the assembly for formation into the final luminaire.

Figure 6:
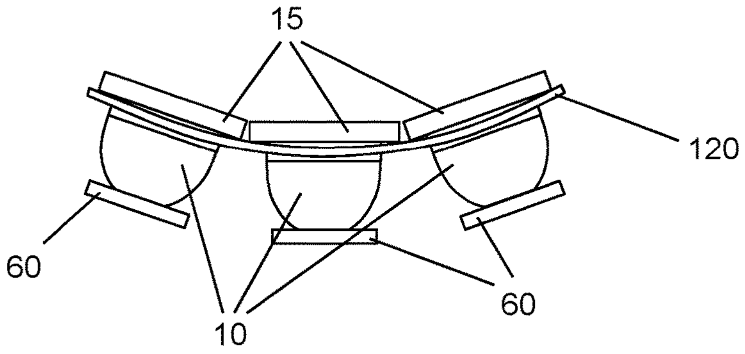
FIG. 6 is a perspective view of another arrangement for forming into a luminaire, in accordance with another embodiment of the invention, in which the configuring element and the resulting array of optical cells is curved or arcuate in shape, instead of flat/planar.

Although in many embodiments of luminaire according to the invention the overall arrangement or assembly of optical cells 10 carried on the configuring element 20 will be substantially flat or planar, as shown in FIGS. 1-5 and 7-9, it is possible in other embodiments for it to be arcuate or otherwise curved in space, so that the overall final arrangement is substantially non-planar. One such example embodiment is shown in FIG. 6, where the alternative configuring element 120 is curved or arcuate in cross-section and thus the individual circuit or wiring board elements 60 on which are mounted the respective LEDs form a generally curved or arcuate arrangement for forming into the final luminaire. Alternatively one or more inherently flexible circuit or wiring boards, or circuit/wiring board elements, could be used instead.

Figure 7:
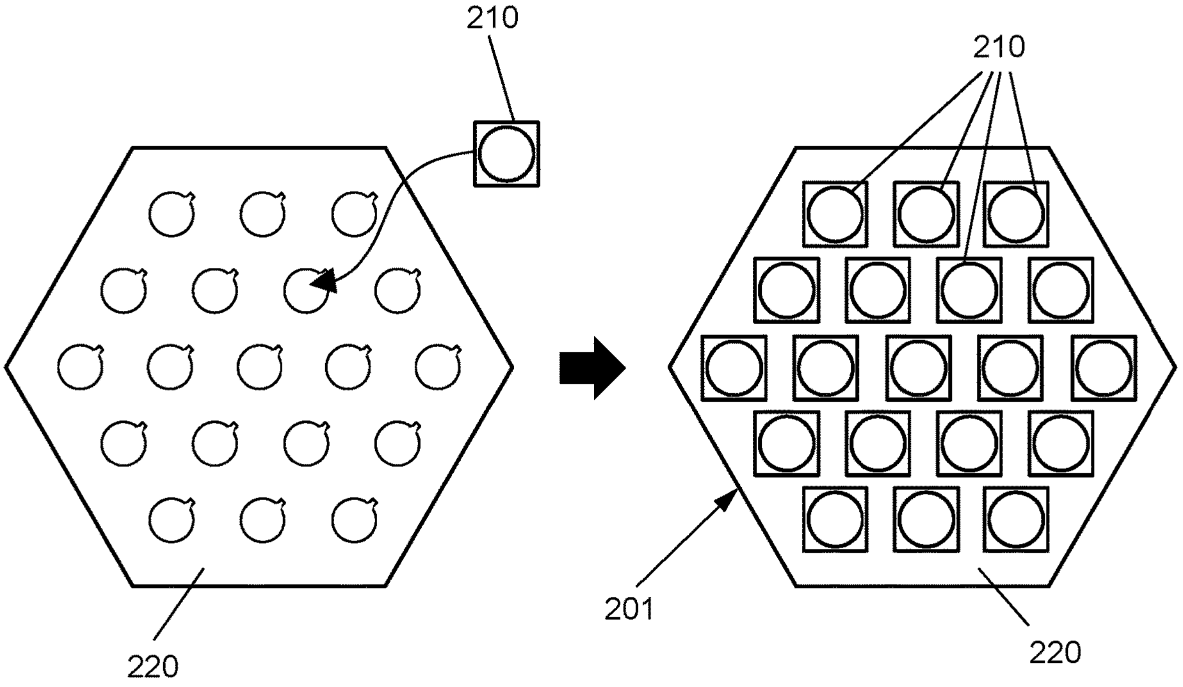
FIG. 7 is a plan view of yet another arrangement for forming into a luminaire, in accordance with yet another embodiment of the invention, in which a hexagonal configuring element (as just one example of a possible polygonal shape thereof) is employed for accommodating an array of a larger number of compact optical cells, each optical cell being of a more advanced practical design that further enhances the modular nature of the luminaire-building system.
Figure 8:
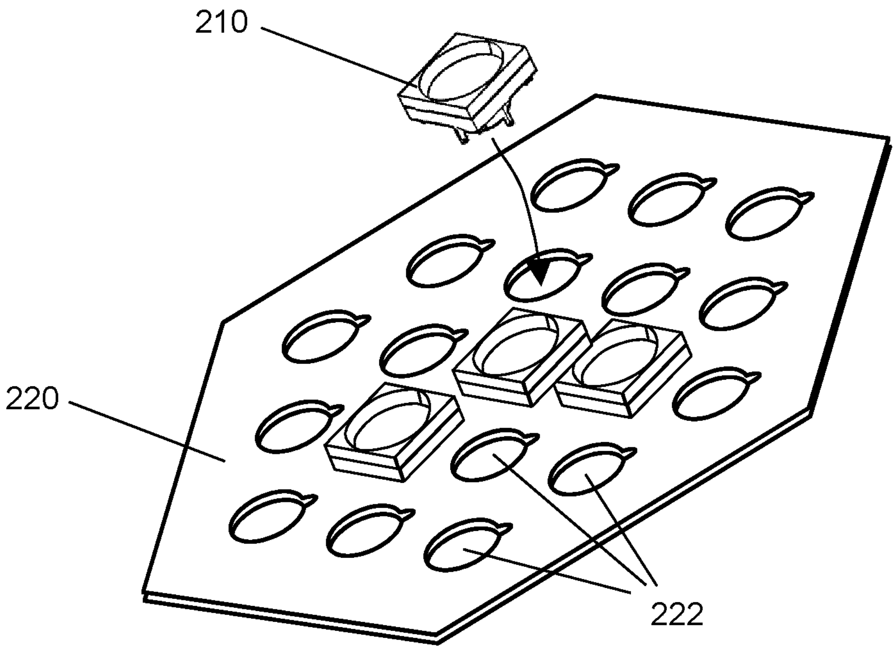
FIG. 8 is a perspective view of the arrangement of FIG. 7, in which the optical cells are in the process of being inserted into the respective mounting apertures in the configuring element.
Figure 9:
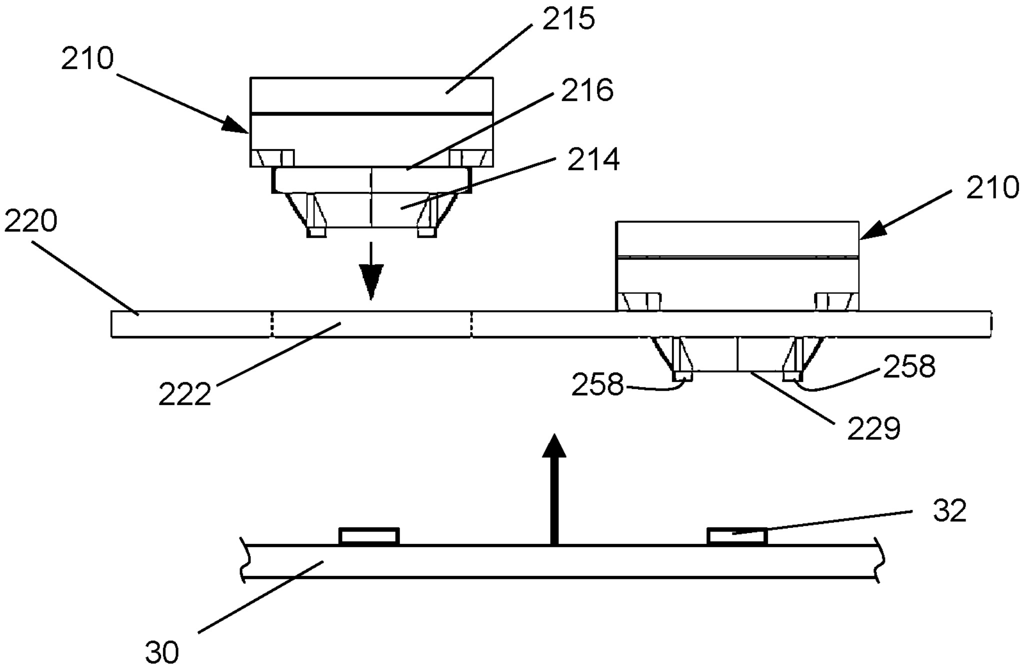
FIG. 9 is an enlarged side-on sectional view of part of the arrangement shown in FIGS. 7 & 8, showing more clearly the manner in which each optical cell is mounted in its respective mounting aperture in the configuring element, and how a circuit board on which are pre-mounted the various LEDs is then brought together with the optical cells+configuring element arrangement in the formation of the complete luminaire.

FIG. 7 shows yet another example embodiment arrangement 201 for forming into a luminaire, in which a hexagonal configuring element 220 is employed for accommodating a symmetrical array of a larger number of compact optical cells 210, each optical cell 210 being of a more advanced practical design that further enhances the modular nature of the luminaire-building system. FIG. 8 shows those optical cells 210 in the process of being inserted into the respective mounting apertures 222 in the configuring element 220, and fixed therein by appropriate means such as gluing or a snap-in or click-in docking mechanism. FIG. 9 shows more clearly and in greater detail the manner in which each optical cell 210 is mounted in its respective aperture 222 in the configuring element 220, and how a circuit board 30 on which are pre-mounted the various LEDs 32 is then brought together with the optical cells 210+configuring element 220 arrangement in the formation of the complete luminaire.

As shown in FIG. 9, in this more advanced practical design of each optical cell 210, each cell 210 comprises an upper cover element 215 and a light collector element 214, with the internal walls of the light collector element 214 forming a chamber therewithin for collecting and redirecting light, e.g. by internal reflection, through the optical cell 210 from the respective LED 32 to the optical cell's output defined by the upper open mouth of the cover element 215. Typically, securely mounted internally within the optical cell 210, between the light collector element 214 and the cover element 215 is a transmission element 216, which has a predetermined optical activity or function (such as from nano-scale or micro-scale optical functional relief on one or more faces/surfaces thereof) in its transmission of light incident thereon as the light is conveyed or propagates through the optical cell 210 from the respective LED 32 to the cell's output.

If desired or appropriate to any given practical example embodiment, in addition to any transmission element 216, there may optionally additionally be included within the optical cell 210, especially within any one or more components of the optical cell 210 (in particular either or both of the light collector element 214 and/or the cover element 215) any suitable arrangement of one or more auxiliary optical elements, e.g. one or more lenses, diffusers, micro- or nano-structured elements or films, or glare reduction elements etc, which may also play a part in defining the overall final light output of the respective optical cell 210, such as by modifying or modulating one or more optical properties of light emitted by the respective LED 32 as it passes or propagates or is conveyed through the optical cell 210, as determined by the optical function(s) of the respective auxiliary optical element(s), optionally in combination with the optical function of any transmission element 216 present.

FIG. 9 also illustrates by way of example one way in which the arrangement may be designed so as to include an air gap 229 (e.g. of up to about 0.5 or 1 or 2 or 3 mm in depth) formed or created between the lower (i.e. input) side of each optical cell 210 and the circuit- or wiring board 30 on which the respective LED 32 is mounted. In this particular illustrated case, the air gap 229 is formed by virtue of one or more pairs of spacer members 258, which are provided on the lower face of the optical cell's light collector element 214, in the form of legs, pins, legs, or spigots 258, which simultaneously also act as mounting means of type (i) defined hereinabove which act as spacer means for defining and setting a predetermined spacing distance between the circuit- or wiring board 30 and the light collector element 214 of the respective optical cell 210. The provision of this air gap 229 helps promote air flow around the components of the arrangement, thereby helping to dissipate heat generated from the respective LED 32 by convective air flow or even by forced air flow (e.g. using a fan included within the overall luminaire apparatus), and thus to help prevent or ameliorate a risk of overheating of the respective LED 32 and/or the neighbouring/adjacent/surrounding components of the arrangement or luminaire. The provision of the air gap 229 also helps to prevent the respective LED 32 from being enclosed in a substantially air-tight space which could itself lead to overheating of same and/or the neighbouring/adjacent/surrounding components.

Figure 10:
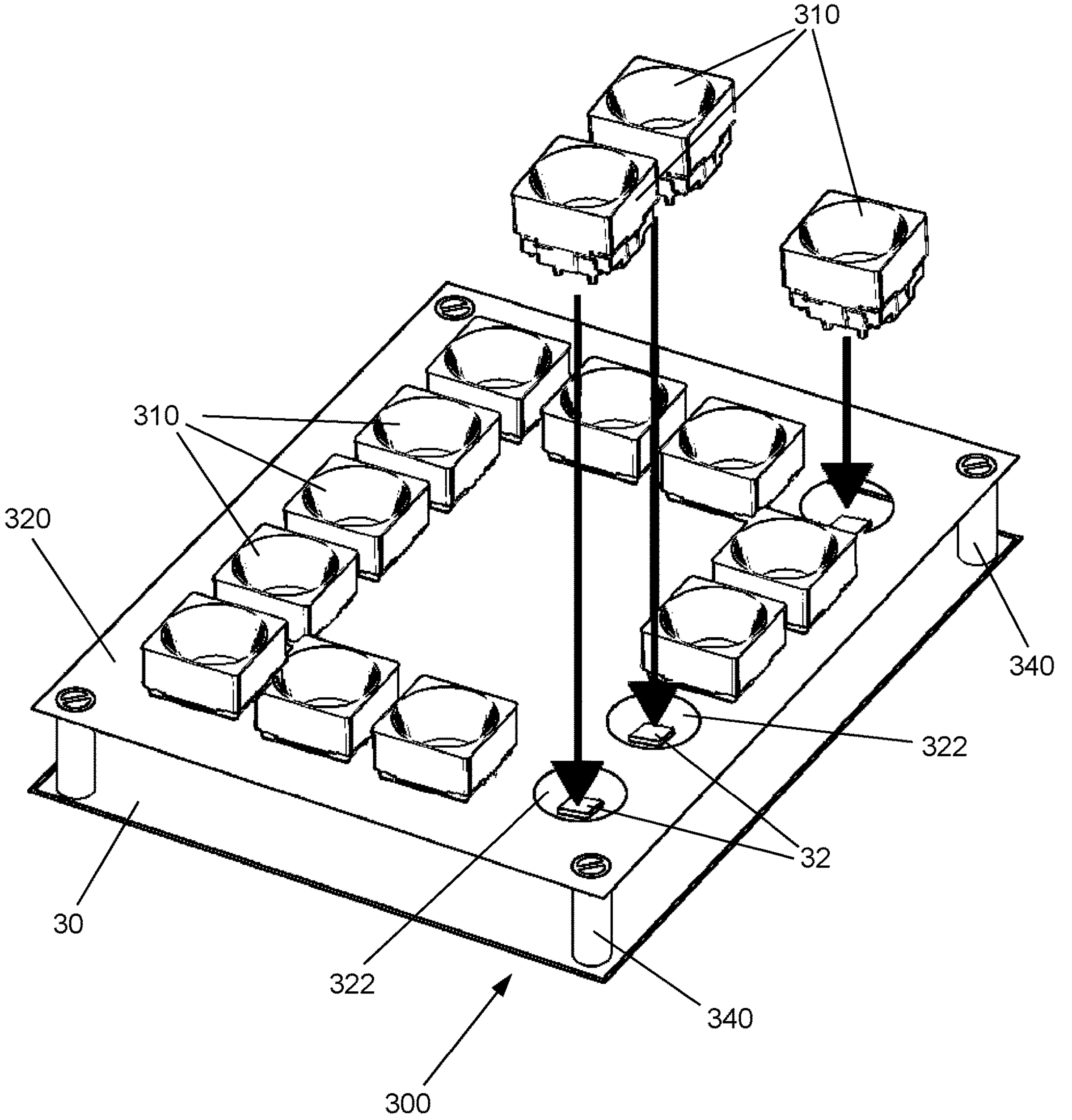
FIG. 10 is a perspective view of the alternative embodiment of the invention, in the form of a sub-assembly prior to its being mounted in a luminaire body or frame, the sub-assembly comprising a circuit or wiring board carrying the relevant LEDs, with a configuring element attached to the board via standoffs, and the cell mounting apertures in the configuring element being in the process of being populated with optical cells.

FIG. 10 shows an example of an alternative embodiment of the invention being implemented in practice. As just one example of one of the kinds of assemblies or sub-assemblies that may be used to from final luminaires, here there is shown a sub-assembly 300 prior to its being mounted in a luminaire body or frame, the sub-assembly 300 comprising a circuit or wiring board 30 carrying the relevant LEDs 32 thereon, with an apertured configuring element 320 attached to the board 30 via standoffs or spacers 340, and the cell mounting apertures 322 in the configuring element 320 being in the process of being populated with optical cells 310.

Especially in the case of embodiment modular arrangements such as that shown in FIGS. 7 to 10 which include a plurality of LEDs 32 finally mounted in a plurality of apertures 222 in the configuring element 220, such modular systems may have an advantage in that they may be readily designed so as to have a plurality of different optical cells or groups, series, clusters or arrays of optical cells combined into a single given luminaire arrangement, with each optical cell or group/series/cluster/array thereof performing a different optical function, such as collimation (i.e. operating as a spot light) or formation of a wide light cone (i.e. operating as a flood light), and these different functions may be switchable by turning on and off certain groups of LEDs on the board. Additionally, the overall outer shapes and sizes of the optical cells may be the same, despite individual optical cells having different optical functionalities. This is just one simple example of a multifunctional luminaire. Other examples could perform other differing optical functions as between different optical cells or groups/series/clusters/arrays of optical cells, for example colour mixing functions or sequential or cycling operations.

Indeed, a wide variety of different designs of such "multi-functional" luminaires may be practised by use of the modular luminaire system of the invention, with its unique configuring element that defines the basic spatial arrangement of discrete optical cells than can then be used to design and build luminaires in a modular fashion with various spatial and/or functional arrangements (these terms being as defined hereinabove) of their constituent optical cells.

Thus, with appropriate design of the modular system luminaires may be designed and created with a wide range of optical functions and overall optical characteristics, thereby giving luminaire designers a wide range of options for how to configure many different luminaire products, which may for example be customized according to specific needs of an end customer.

Throughout the description and claims of this specification, the words "comprise" and "contain" and linguistic variations of those words, for example "comprising" and "comprises", mean "including but not limited to", and are not intended to (and do not) exclude other moieties, additives, components, elements, integers or steps.

Throughout the description and claims of this specification, the singular encompasses the plural unless expressly stated otherwise or the context otherwise requires. In particular, where the indefinite article is used, the specification is to be understood as contemplating plurality as well as singularity, unless expressly stated otherwise or the context requires otherwise.

Throughout the description and claims of this specification, features, components, elements, integers, characteristics, properties, compounds, chemical moieties or groups described in conjunction with a particular aspect, embodiment or example of the invention are to be understood to be applicable to any other aspect, embodiment or example described herein unless incompatible therewith or expressly stated otherwise.

The invention claimed is:

1. An arrangement for forming into a luminaire, the arrangement comprising:

one or more optical cells configured for receiving, collecting and redistributing light from a respective one of one or more light sources; and a configuring element for accommodating the one or more optical cells in a predefined relative configuration or pattern, wherein:

the configuring element comprises a sheet or plate or film of material having one or more apertures therein in the predefined relative configuration or pattern, each aperture being configured for receiving therein, or being configured for and having received therein, a respective one of the optical cells;

the one or more optical cells each comprises:

a light collector element;

a cover element attached to the light collector element; and a transmission element mounted between the light collector element and the cover element;

the light collector element comprises a body including:

an input for receiving and collecting light from at least one light source;

an output for propagating collected light towards the transmission element;

at least one wall defining one or more portions of the body between its input and output and configured for collecting light entering the body via its input and conveying or directing the light towards its output; and an attachment for mechanically attaching the body of the light collector element to the cover element and securing the transmission element between the light collector element and the cover element;

the cover element comprises:

an input opening facing towards the transmission element and for receiving light transmitted by the transmission element;

an output opening via which light is outputted from the optical cell; and at least one internal surface defining a cavity within the cover element between its input and output openings, the cavity's internal surface(s) being configured for allowing or effecting passage of light, or a portion of the light, through the cavity from the cover element's input opening towards its output opening; and the transmission element comprises one or more planar optical elements;

the one or more optical elements each includes a first surface facing towards the output of the light collector element and a second surface facing towards the input opening of the cover element; and the one or more optical elements each exhibits a predetermined optical activity or function in its transmission of light incident thereon which has exited the output of the light collector element and is transmitted by the transmission element towards the input opening of the cover element.

2. The arrangement according to claim 1, wherein:

the one or more light sources is/are present or has/have been mounted or positioned or otherwise included in or on or adjacent the respective optical cell(s) of the arrangement, and the cell(s) has/have been received in the respective aperture(s) of the configuring element, whereby each of the one or more optical cells can receive and collect light from a respective one of the one or more light sources; and the configuring element accommodates or carries the one or more optical cells in the predefined relative configuration or pattern, by virtue of each aperture of the configuring element having received therein a respective one of the optical cells.

3. The arrangement according to claim 1, wherein:

either (i) each one of the one or more light sources comprises a single LED or other light emitting device, whereby the or each optical cell comprises, or has mounted or positioned therein or thereon or thereadjacent, or is for having mounted or positioned therein or thereon or thereadjacent, a single LED or other light emitting device;

or (ii) each one of the one or more light sources comprises a plurality of LEDs or other light emitting devices, in the form of an array, cluster, series or group thereof, whereby the or each optical cell comprises, or has mounted or positioned therein or thereon or thereadjacent, or is for having mounted or positioned therein or thereon or thereadjacent, an array, cluster, series or group of a plurality of LEDs or other light emitting devices.

4. The arrangement according to claim 1, wherein one of the following (i) or (ii) is present or satisfied:

(i) the one or more light sources in the relative configuration or pattern which are used to form the luminaire are mounted or arranged on at least one circuit board or wiring board, or at least one portion of a circuit board or wiring board, in substantially a single common plane, optionally by virtue of being mounted on a single common planar circuit board or wiring board, or a single common planar portion of either thereof, or a plurality of individual circuit board or wiring board elements each lying in a common plane; or (ii) the one or more light sources in the relative configuration or pattern which are used to form the luminaire are mounted or arranged either:

(ii)(a) on a single common circuit board or wiring board, or a single common portion of either thereof, which is shaped or configured in a substantially non-planar, or arcuate or otherwise curved in three dimensions, shape or configuration, or (ii)(b) on a plurality of individual circuit board or wiring board elements which are collectively arranged or configured relative to each other so as to form a substantially non-planar, or arcuate or otherwise curved in three dimensions, shaped or configured circuit board/wiring board arrangement.

5. The arrangement according to claim 1, wherein the arrangement comprises a plurality of the light sources, and the light sources are provided in the form of at least one circuit board or wiring board, or a portion of a circuit board or wiring board, having the various light sources already mounted thereon, the arrangement of the light sources thereon being the same as, or corresponding to, or matching, or being synchronized with, the predefined relative configuration or pattern of the apertures in the configuring element.

6. The arrangement according to claim 1, wherein the configuring element comprises, or is in the form of, a sheet, plate or film, optionally a sheet, plate or film of substantially uniform thickness;

optionally wherein:

either (i) the sheet, plate or film is substantially planar or flat, or (ii) the sheet, plate or film is curved or arcuate in three dimensions, or it can be formable into such a curved or arcuate shape;

further optionally wherein the sheet, plate or film material has a thickness in the range of from about 0.2 or 0.3 or 0.4 or 0.5 or 1 up to about 3 or 4 or 5 mm; and yet further optionally wherein the sheet, plate or film is of a sufficient thickness, and/or formed of a suitable material, such that the sheet, plate or film is of sufficient strength and rigidity so as to be able to substantially hold its own shape in space, optionally as a flat planar shape or alternatively as an arcuate or curved-in-three-dimensions shape, and in either case without significant bending or distortion.

7. The arrangement according to claim 1, wherein one or more of the following (i) and (ii) is/are present or satisfied:

(i) the material of the configuring element comprises a plastics material, optionally a thermoplastic or thermosetting polymeric material, or a metal or metal alloy; and (ii) the material of the configuring element is an optically inactive material, whereby it substantially does not perform or exhibit any significant degree of optical functionality of the nature of diffraction, refraction or other modification of the wavelength, phase, directional or intensity characteristics of transmitted or reflected light passing through or incident on the configuring element, and whereby it substantially does not contribute to the overall optical functionality of the or each optical cell of the arrangement.

8. The arrangement according to claim 1, wherein the configuring element comprises alignment elements for defining and/or facilitating appropriate or correct positioning and/or orientation of the configuring element, or an arrangement or assembly comprising it, in a body or frame of the luminaire into which it is, or is to be, incorporated.

9. The arrangement according to claim 1, wherein:

either (i) the or each aperture in the configuring element is shaped and/or configured to receive therein a respective one of the optical cells, and at least part of defining wall(s) of the or each aperture in the configuring element substantially geometrically match(es) or duplicate(s) the external shape of at least part of the respective optical cell, so that the respective optical cell can be retained in its respective aperture in the configuring element by means of a friction fit;

or (ii) each optical cell is receivable and securable in its respective aperture in the configuring element by virtue of respective securement, retention or locking means.

10. The arrangement according to claim 1, wherein at least part of defining wall(s) of the or each aperture, together with at least part of an external wall of the respective optical cell, collectively comprise one or more orientation elements for effecting reception of the respective optical cell in the respective aperture in any selected one of one or two or a plurality of specific discrete or fixed possible orientations relative to each other, and optionally wherein the orientation elements comprise a number of pairs of mutually inter-engageable inter-engagement elements or features provided on each of an external wall of the respective optical cell and the defining interior wall(s) of the respective aperture.

11. The arrangement according to claim 1, wherein the or each optical cell further comprises attachment elements, or a component of attachment elements, for mechanically and securely—and optionally also removably—attaching the optical cell to the configuring element;

optionally wherein any one of (i), (ii), (iii) or (iv) below is present or satisfied:

(i) the attachment elements comprise a friction-fitting engagement between an outer wall of the respective optical cell and the defining wall(s) of a respective mounting aperture in the configuring element; or (ii) the attachment elements comprise one or more, optionally one or more pairs of or a plurality of, snap-fit connection or docking elements provided on the optical cell which is/are inter-engageable in a snap-fit manner with one or more corresponding snap-fit connection or docking elements provided on the configuring element, optionally wherein the one or more corresponding snap-fit connection or docking elements provided on the configuring element is/are provided adjacent a respective mounting aperture in the configuring element into which the respective optical cell is to be mounted; or (iii) the attachment elements comprise a mechanical docking-type inter-engagement in which each one of the respective optical cell and the configuring element is provided with a respective one of a pair of mutually inter-engageable detents, hooks, catches, clips or other docking inter-engagement elements, whose mechanical inter-engagement together effects the docking inter-engagement of the respective optical cell and the configuring element, optionally wherein plural such pairs of mutually inter-engageable docking elements are provided, located on opposite sides of the respective optical cell and adjacent opposite sides of the respective mounting aperture in the configuring element, for enhancing the security and stability of the docking mounting of the respective optical cell on the configuring element; or (iv) the attachment elements comprise one or more, optionally a plurality of or one or more pairs of, snap-fit or click-in or other interconnection or docking or hooking or locking elements provided on the respective optical cell alone or the configuring element alone.

12. The arrangement according to claim 1, wherein there are provided either one of, or both of:

(i) secondary mounting elements for mounting or securing or attaching the configuring element on or to a circuit board or wiring board, or a portion of either thereof, carrying the respective light source(s) for association with the respective optical cell(s); and/or (ii) tertiary mounting elements for mounting or securing or attaching the configuring element to a luminaire body or frame.

13. The arrangement according to claim 1, wherein the arrangement includes one or more spacers for forming or creating one or more air gaps or spaces between two or more components of the arrangement once those components have been brought together in the forming of the arrangement for the forming of the luminaire, optionally wherein the arrangement includes the spacers for forming or creating one or more air gaps or spaces, or series of air gaps or spaces, between the components of any one or more of the following pairs of components of the arrangement (where such components are provided in the relevant arrangement):

(i) an input side of the or each optical cell and the configuring element;

(ii) an input side of the or each optical cell and a circuit board or wiring board carrying the respective light source associated with that respective optical cell;

(iii) an input side of the or each optical cell and the respective light source associated with that respective optical cell;

(iv) one or more side walls of the or each optical cell and the respective light source associated with that respective optical cell; or (v) the configuring element and a circuit board or wiring board carrying the respective light source associated with that respective optical cell.

14. An arrangement according to claim 2, wherein one or more of the following (i) and (ii) is/are present or satisfied:

(i) the plurality of apertures and the plurality of light sources are spatially arranged in or on the configuring element in a plurality of discrete groups, series, clusters or arrays, whereby one or more individual such groups, series, clusters or arrays is/are located in a or a respective discrete section or region of the configuring element which is different from or spaced apart from the other section(s) or region(s) of the configuring element in which is/are located the other group(s), series, cluster (s) or array(s); or (ii) the plurality of apertures and the plurality of light sources are functionally arranged in or on the configuring element in a plurality of discrete groups, series, clusters or arrays, whereby one or more individual such groups, series, clusters or arrays is/are either (i) operable independently of one or more of the other groups, series, clusters or arrays, and/or (ii) designed and/or constructed to exhibit different lighting characteristics and/or different optical functions from one or more of the other groups, series, clusters or arrays, optionally wherein appropriate control over the individual groups', series', clusters' or arrays' operation is effectable by appropriate switching and/or electronic controller.

15. A luminaire comprising:

at least one arrangement according to claim 1;

a body or frame in which the arrangement is contained; and one or more light sources, optionally one or more LEDs (light emitting diodes), each said light source being mounted or positioned in or on or adjacent a respective optical cell received in a respective aperture of the configuring element, whereby the or each optical cell can receive, collect and redistribute light from a respective one of the one or more light sources;

whereby the one or more light sources are contained in the luminaire in the predefined relative configuration or pattern defined by the aperture(s) in the configuring element; and optionally wherein the luminaire further comprises at least one circuit board or wiring board on which is/are mounted, or has/have been pre-mounted, the one or more light sources.

16. An assembly for forming into a luminaire, which assembly is any one of the following (i), (ii) or (iii):

(i) an assembly comprising:

at least one arrangement according to claim 1; and a body or frame in which the arrangement is contained;

wherein each respective optical cell received in a respective aperture of the configuring element is for receiving, collecting and redistributing light from a respective one of the one or more light sources in the predefined relative configuration or pattern defined by the aperture(s) in the configuring element;

(ii) an assembly comprising:

at least one arrangement according to claim 1; and one or more light sources, optionally one or more LEDs (light emitting diodes), each one or the one or more light sources being mounted or positioned in or on or adjacent a respective optical cell received in a respective aperture of the configuring element, whereby the or each optical cell can receive, collect and redistribute light from a respective one of the one or more light sources;

optionally wherein the or each light source is mounted or pre-mounted on at least one circuit board or wiring board, or a portion of a circuit board or wiring board, and the assembly further comprises said circuit board or wiring board, or portion of either thereof; or (iii) an assembly comprising:

a body or frame; and one or more light sources, optionally one or more LEDs (light emitting diodes), mounted or positioned in the body or frame, the or each light source being mounted or pre-mounted on at least one circuit board or wiring board or a portion of a circuit board or wiring board, wherein the or each light source is arranged and/or positioned and/or configured for having mounted or positioned thereon or thereover or thereadjacent a respective optical cell of an arrangement according to claim 1, once the or the respective arrangement has been mounted or positioned in the body or frame.

17. A method of production of a luminaire, the method comprising:

(i) forming an arrangement according to claim 1 by:

(i)(a) providing the one or more optical cells each for receiving, collecting and redistributing light from a respective one of one or more light sources;

(i)(b) providing a configuring element for accommodating the one or more optical cells in a predefined relative configuration or pattern, wherein the configuring element comprises a sheet or plate or film of material having one or more apertures therein in the predefined relative configuration or pattern, each aperture being configured for receiving therein a respective one of the optical cells; and (i)(c) inserting each respective optical cell into a respective aperture in the configuring element so as to form the arrangement;

(ii) mounting or positioning the one or more light sources, optionally the one or more LEDs (light emitting diodes), in or on or adjacent respective optical cell(s) received in respective aperture(s) of the configuring element, whereby the resulting relative configuration or pattern of the one or more light sources is substantially the same as or corresponds to the predefined relative configuration or pattern of the apertures in the configuring element; and, either before or after this step (ii); and (iii) mounting or positioning the arrangement in a body or frame of the luminaire;

optionally wherein the step (ii) of mounting or positioning the one or more light sources in or on or adjacent respective optical cell(s) received in respective aperture (s) of the configuring element comprises either:

mounting or positioning in or on or adjacent respective optical cell(s) of the arrangement at least one circuit board or wiring board, or a portion of a circuit board or wiring board, on which has/have already been pre-mounted the one or more light sources in the relative configuration or pattern which is substantially the same as or corresponds to the predefined relative configuration or pattern of the apertures in the configuring element; or mounting or positioning respective optical cell(s) of the arrangement on or over or adjacent respective one(s) of the one or more light sources, especially on or over or adjacent respective one(s) of the one or more light sources which has/have already been pre-mounted on the circuit board or wiring board or portion of a circuit board or wiring board.

18. A kit of parts for use in forming a luminaire, the kit comprising:

one or more, or any plurality of, optical cells each for receiving, collecting and redistributing light from a respective one of one or more light sources, optionally one or more LEDs (light emitting diodes), wherein the one or more optical cells each comprises:

a light collector element;

a cover element attached to the light collector element; and a transmission element mounted between the light collector element and the cover element;

the light collector element comprises a body including:

an input for receiving and collecting light from at least one light source;

an output for propagating collected light towards the transmission element;

at least one wall defining one or more portions of the body between its input and output and configured for collecting light entering the body via its input and conveying or directing the light towards its output; and an attachment for mechanically attaching the body of the light collector element to the cover element and securing the transmission element between the light collector element and the cover element;

the cover element comprises:

an input opening facing towards the transmission element and for receiving light transmitted by the transmission element;

an output opening via which light is outputted from the optical cell; and at least one internal surface defining a cavity within the cover element between its input and output openings, the cavity's internal surface(s) being configured for allowing or effecting passage of light, or a portion of the light, through the cavity from the cover element's input opening towards its output opening; and the transmission element comprises one or more planar optical elements;

the one or more optical elements each includes a first surface facing towards the output of the light collector element and a second surface facing towards the input opening of the cover element; and the one or more optical elements each exhibits a predetermined optical activity or function in its transmission of light incident thereon which has exited the output of the light collector element and is transmitted by the transmission element towards the input opening of the cover element; and a configuring element for accommodating the one or more optical cells in a predefined relative configuration or pattern, wherein the configuring element comprises a sheet or plate or film of material having one or more apertures therein in the predefined relative configuration or pattern, each aperture being configured for receiving therein a respective one of the optical cells.

19. The arrangement according to claim 1, wherein the one or more light sources comprises one or more light emitting diodes.

20. The arrangement according to claim 2, further comprising at least one circuit board or wiring board, or a portion of a circuit board or wiring board, having the one or more light sources mounted, or pre-mounted, thereon in the predefined relative configuration or pattern.

21. The kit according to claim 18, further comprising at least one of:

a body or frame for containing components of the luminaire; and the one or more, or the plurality of, light sources, optionally, one or more LEDs (light emitting diodes), for mounting or positioning in or on or adjacent a respective optical cell when received in a respective said aperture of the configuring element, whereby the or each optical cell can receive, collect and redistribute light from a respective said light source.

* * * * *